(12) United States Patent
Lawrence et al.

(10) Patent No.: US 8,740,207 B2
(45) Date of Patent: Jun. 3, 2014

(54) FOLDING BENCH

(75) Inventors: Mark Lawrence, Owings Mills, MD (US); Michael G. Sirois, Ottawa (CA); Robert D. Watters, Ottawa (CA); Jason F. Busschaert, Bel Air, MD (US); Tong Yanbin, Qibao (CN); Han Tao, Suzhou (CN); Mark E. Robson, N. Yorks (GB)

(73) Assignee: Black & Decker Inc., Newark, DE (US)

( * ) Notice: Subject to any disclaimer, the term of this patent is extended or adjusted under 35 U.S.C. 154(b) by 135 days.

(21) Appl. No.: 13/417,480

(22) Filed: Mar. 12, 2012

(65) Prior Publication Data
US 2012/0205848 A1 Aug. 16, 2012

Related U.S. Application Data

(60) Continuation of application No. 11/487,785, filed on Jul. 17, 2006, now Pat. No. 8,152,149, which is a division of application No. 10/911,778, filed on Aug. 4, 2004, now Pat. No. 7,090,210.

(60) Provisional application No. 60/492,633, filed on Aug. 5, 2003.

(51) Int. Cl.
*B23Q 1/00* (2006.01)

(52) U.S. Cl.
USPC ............................................ 269/139; 269/17

(58) Field of Classification Search
USPC .................................. 269/139, 136, 138, 16
See application file for complete search history.

(56) References Cited

U.S. PATENT DOCUMENTS

| | | | |
|---|---|---|---|
| 364,385 | A | 6/1887 | Trenholm |
| 814,858 | A | 3/1906 | Markham |
| 1,024,469 | A | 4/1912 | Ballinger |
| 1,484,864 | A | 2/1924 | Bompart |
| 2,113,174 | A | 4/1938 | Earle |
| 2,474,722 | A | 6/1949 | Blume |
| 2,582,435 | A | 1/1952 | Howard |
| 2,846,233 | A | 8/1958 | Burg |
| 2,964,328 | A | 12/1960 | Muir |
| 3,104,889 | A | 9/1963 | Branch, Jr. |
| 3,147,748 | A | 9/1964 | Frank |
| 3,647,238 | A | 3/1972 | Mackey |
| 3,655,212 | A | 4/1972 | Krass et al. |
| 3,788,659 | A | 1/1974 | Allen |
| 3,804,432 | A | 4/1974 | Lehrman |
| 3,941,399 | A | 3/1976 | Peters et al. |
| 4,154,435 | A * | 5/1979 | Alessio ..................... 269/139 |
| 4,185,853 | A | 1/1980 | Thurmond, Jr. |
| 4,235,449 | A | 11/1980 | Tarran |

(Continued)

FOREIGN PATENT DOCUMENTS

DE 819724 C 11/1951
DE 1 776 993 U 11/1958

(Continued)

*Primary Examiner* — Lee D Wilson
(74) *Attorney, Agent, or Firm* — Harness, Dickey & Pierce, P.L.C.

(57) ABSTRACT

A portable workbench includes a pair of first support structures, a pair of second support structures, a first top member coupled to the first support structures, a second top member and a clamping mechanism. Each second support structure is pivotally coupled to an associated one of the first support structures. The clamping mechanism is coupled to the second support structures and is configured to selectively translate the second top member relative to the second support structures.

20 Claims, 39 Drawing Sheets

(56) References Cited

U.S. PATENT DOCUMENTS

| | | |
|---|---|---|
| 4,236,599 A | 12/1980 | Luff et al. |
| 4,284,286 A | 8/1981 | Lewallen |
| 4,315,632 A | 2/1982 | Taylor |
| 4,494,626 A | 1/1985 | Ast |
| 4,531,752 A | 7/1985 | Diener |
| 4,565,382 A | 1/1986 | Sherman |
| 4,611,823 A | 9/1986 | Haas |
| 4,865,346 A | 9/1989 | Carlile |
| 4,934,718 A | 6/1990 | Voegele |
| 4,974,871 A | 12/1990 | Mao |
| 5,024,458 A | 6/1991 | Kazmark et al. |
| 5,067,535 A * | 11/1991 | Wolff .................. 144/286.1 |
| 5,382,032 A | 1/1995 | Wilson |
| 5,542,740 A | 8/1996 | Chang |
| 5,836,595 A | 11/1998 | Brice |
| 5,893,572 A | 4/1999 | Parks |
| 5,924,684 A | 7/1999 | Cheng |
| 5,941,543 A | 8/1999 | Kazmark, Jr. |
| 5,950,999 A * | 9/1999 | Lin ............................ 269/139 |
| 5,957,472 A | 9/1999 | Borgatti |
| D436,268 S | 1/2001 | Ko |
| 6,343,783 B1 * | 2/2002 | Ke ............................. 269/139 |
| 6,345,829 B1 | 2/2002 | Mueller |
| 6,530,583 B1 | 3/2003 | Mueller |
| 6,588,775 B2 | 7/2003 | Malone, Jr. |
| 6,601,859 B2 | 8/2003 | Durham |
| 6,651,774 B2 | 11/2003 | Yoo |
| 6,749,189 B1 | 6/2004 | Wolff et al. |
| 6,769,674 B2 * | 8/2004 | Chang ......................... 269/139 |
| 6,848,684 B2 | 2/2005 | Fortin et al. |
| 6,883,793 B2 * | 4/2005 | Fortin et al. .................. 269/139 |
| 7,090,210 B2 | 8/2006 | Lawrence et al. |
| 2003/0214088 A1 * | 11/2003 | Chang ......................... 269/139 |
| 2004/0051223 A1 * | 3/2004 | Fortin et al. .................. 269/139 |
| 2004/0051224 A1 | 3/2004 | Fortin et al. |
| 2005/0035517 A1 | 2/2005 | Lawrence et al. |
| 2006/0255522 A1 | 11/2006 | Lawrence et al. |
| 2007/0108683 A1 | 5/2007 | Lawrence et al. |

FOREIGN PATENT DOCUMENTS

| | | |
|---|---|---|
| DE | 1 804 835 A1 | 1/1960 |
| DE | 1 963 059 A1 | 6/1967 |
| DE | 90 14 007 U1 | 2/1992 |
| DE | 41 34 867 A1 | 4/1992 |
| DE | 296 05 040 U1 | 6/1996 |
| EP | 0 391 115 A2 | 10/1990 |
| EP | 0 681 890 A1 | 11/1995 |
| GB | 2 025 831 A | 1/1980 |
| GB | 2 051 690 A | 1/1981 |
| GB | 2 247 650 A | 3/1992 |
| JP | 07215217 A | 8/1995 |

* cited by examiner

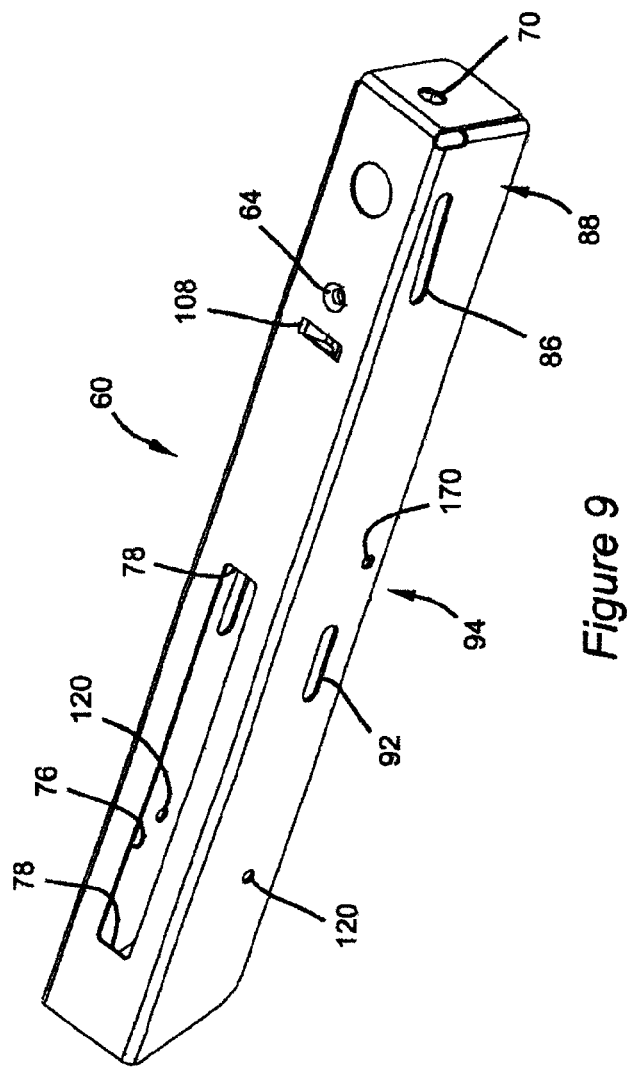
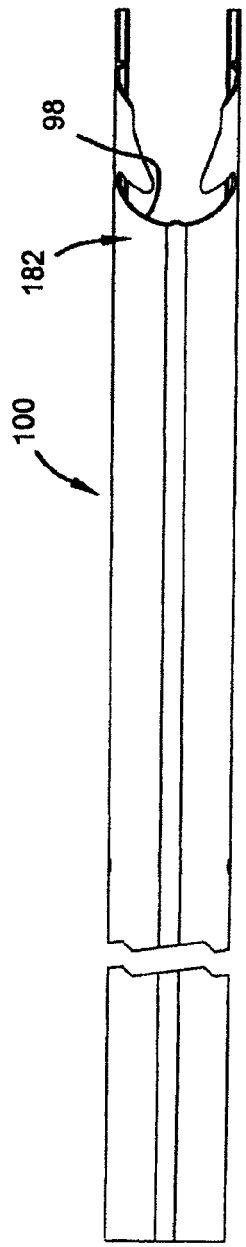
Figure 9
Figure 10

FOLDING BENCH

CROSS-REFERENCE TO RELATED APPLICATIONS

This application is continuation of U.S. patent application Ser. No. 11/487,785 filed Jul. 17, 2006, which is a division of U.S. patent application Ser. No. 10/911,778 filed on Aug. 4, 2004 (now U.S. Pat. No. 7,090,210 issued Aug. 15, 2006), which claims the benefit of U.S. Provisional Application No. 60/492,633, filed on Aug. 5, 2003. The disclosure of each of the above applications is incorporated by reference as if fully set forth in detail herein.

FIELD

The present disclosure relates to a folding bench.

BACKGROUND

It is known in the art to provide a workbench having a movable table-top member that is configured to cooperate with a stationary table-top member to clamp a workpiece. There remains a need in the art for a workbench, such as a collapsible workbench, that provides increased flexibility for the clamping of a workpiece.

SUMMARY

In one form, the present disclosure provides a portable workbench having a pair of top members, a support structure, a frame, a pair of wheels and a toe plate. The top members lie in a common plane and define a working surface with opposing side portions that define clamping surfaces. The support structure supports the top members and includes a clamp for selectively traversing at least one of the pair of top members toward the other of said top members to permit a workpiece to be selectively clamped therebetween. The frame has a base, a pair of legs, which extend between the support structure and the base, and a linkage that movably connects the support structure, said legs and said base. The linkage includes a pair of link members that are pivotally coupled at first ends to the support structure and slidably coupled at opposite second ends to an associated one of the legs. The wheels and the toe plate are coupled to the frame. The frame is positionable in a raised position and a collapsed position. The toe plate is movable from a retracted position to an extended position to permit the portable workbench to be employed as a hand truck when the frame is positioned in the collapsed position.

In still another form, the present teachings provide a portable workbench that includes a pair of first support structures, a pair of second support structures, a first top member coupled to the first support structures, a second top member and a clamping mechanism. Each second support structure is pivotally coupled to an associated one of the first support structures. The clamping mechanism is coupled to the second support structures and is configured to selectively translate the second top member relative to the second support structures.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 9 is a perspective view of a support member;

FIG. 10 is a plan view of a leg incorporated in the collapsible frame;

DETAILED DESCRIPTION

The following description is merely exemplary in nature and is not intended to limit the present disclosure, application, or uses.

Figure 1:
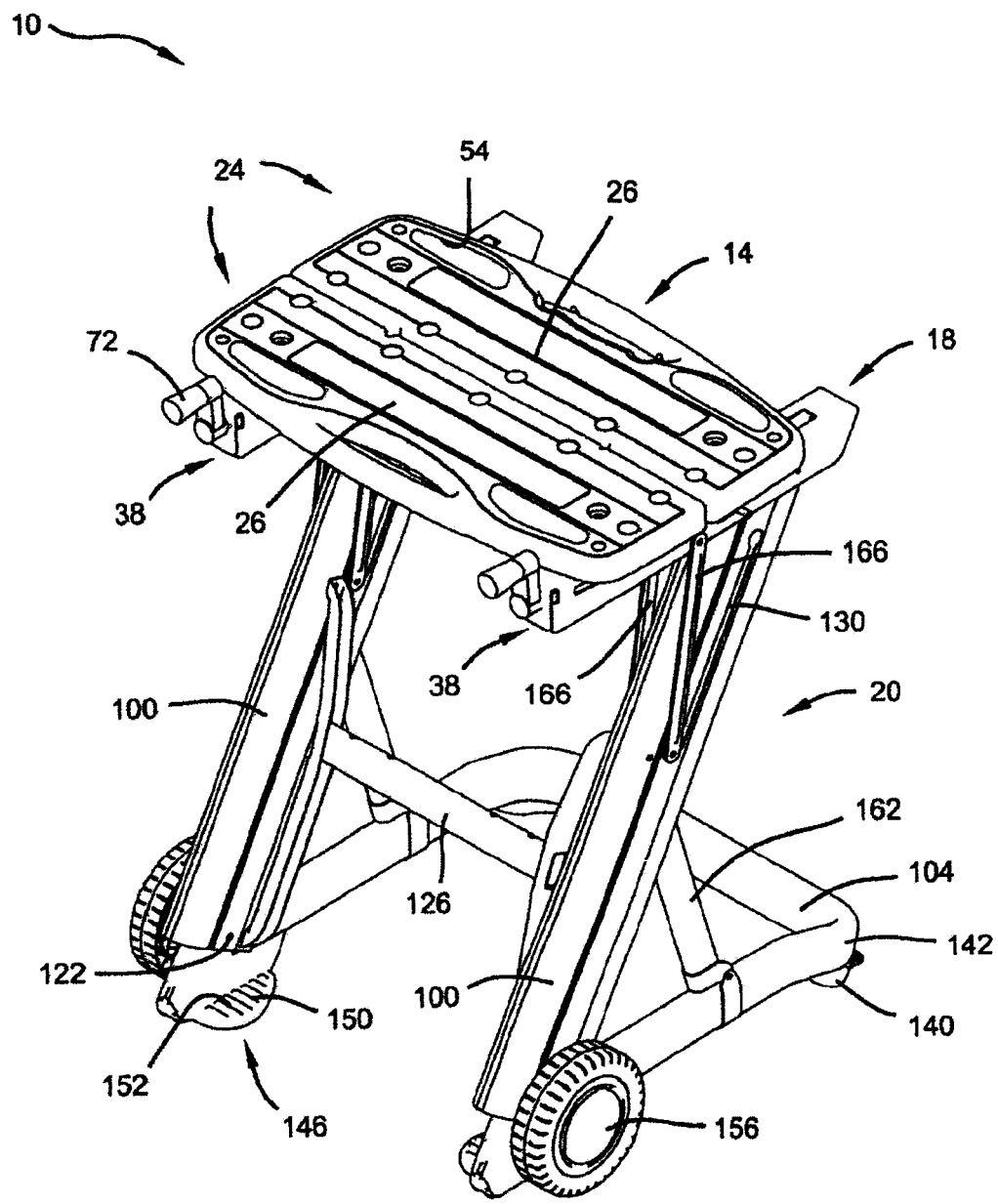
FIG. 1 is a front perspective view of a workbench constructed in accordance with the teachings of the present disclosure, the workbench being shown in a raised position.
Figure 2:
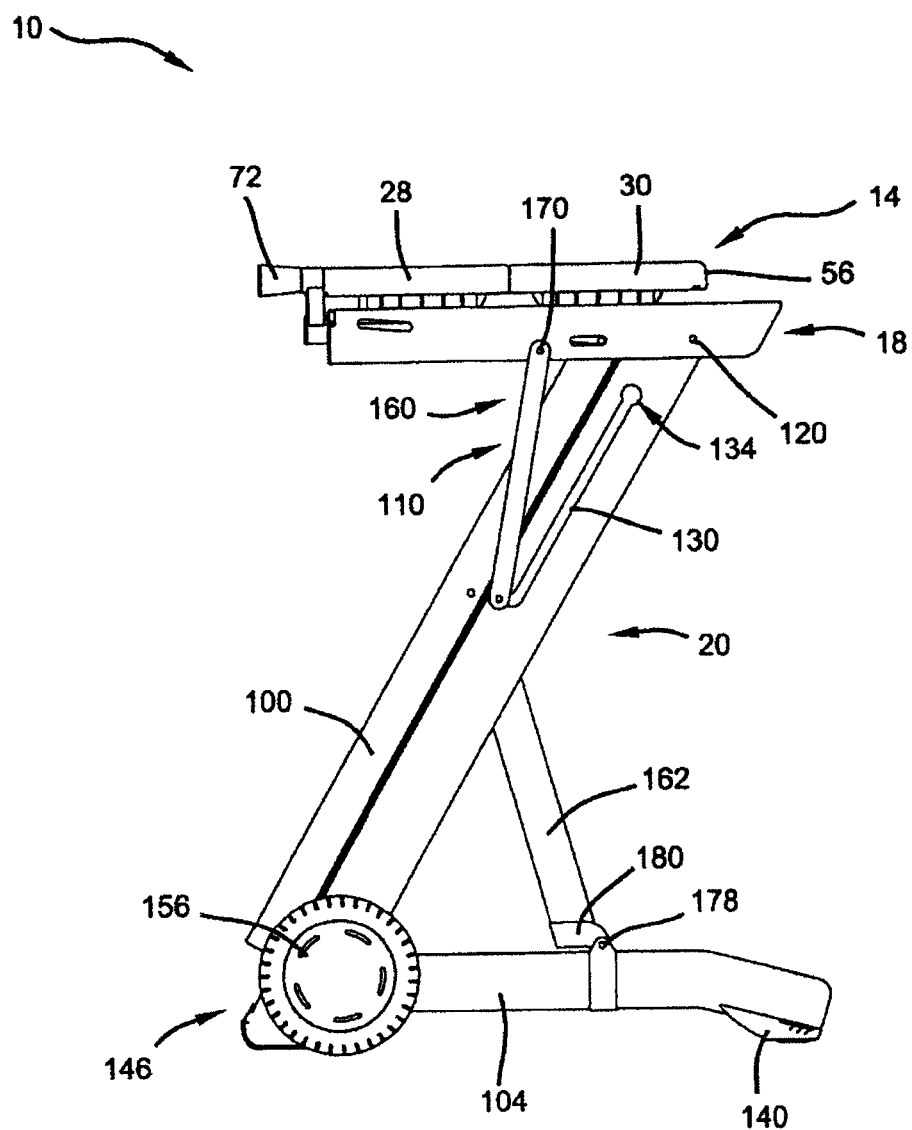
FIG. 2 is a side view of the workbench of FIG. 1 with the workbench being shown in an raised position.
Figure 3:
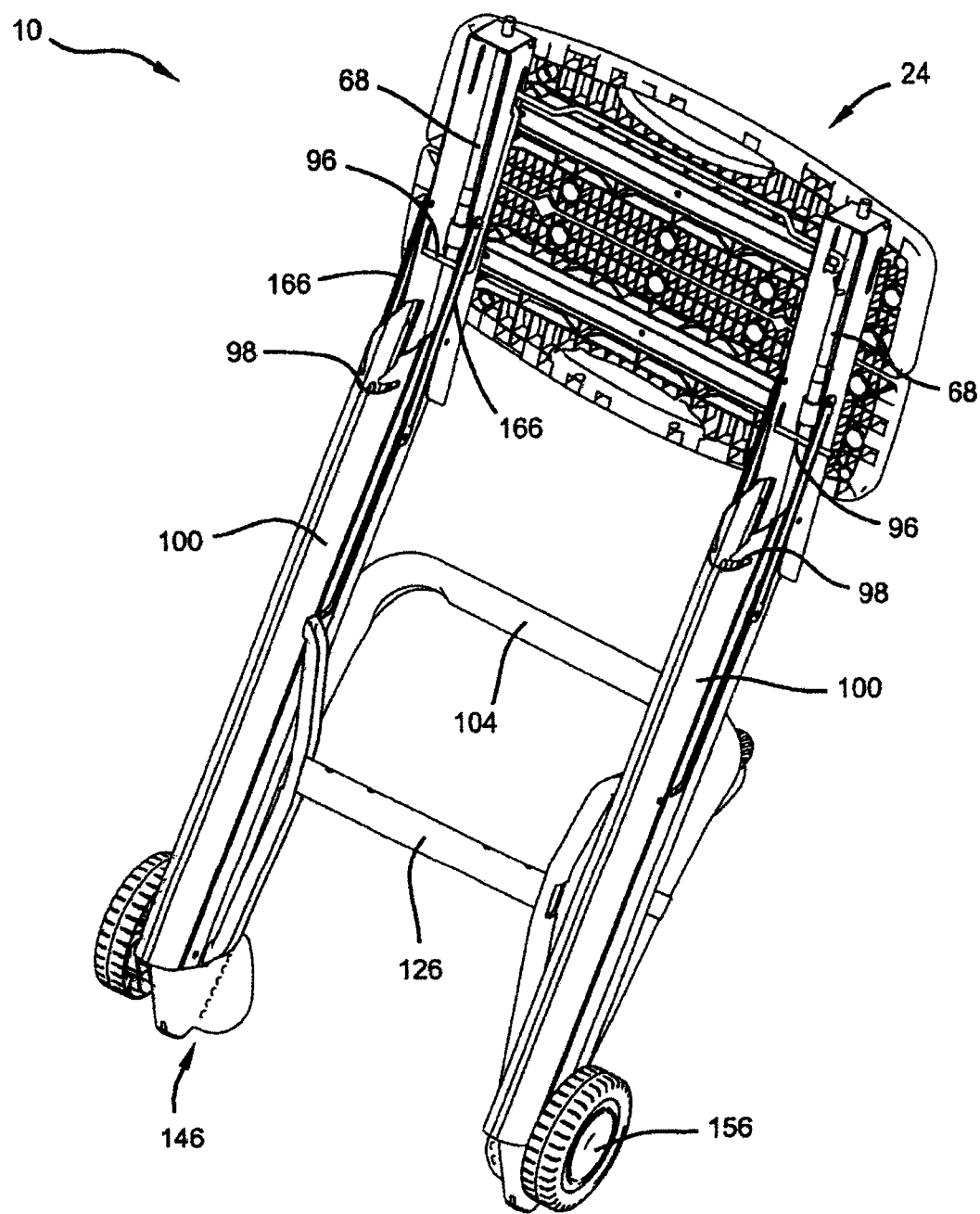
FIG. 3 is a rear perspective view of the workbench of FIG. 1 with the workbench being shown in a collapsed position.

With initial reference to FIGS. 1-4, a portable workbench 10 according to the present disclosure is shown. Workbench 10 generally includes a top structure 14, a support structure 18 and a collapsible frame 20. Workbench 10 is movable between a raised position, as shown in FIG. 1, and a collapsed position, as shown in FIG. 3.

Figure 4:
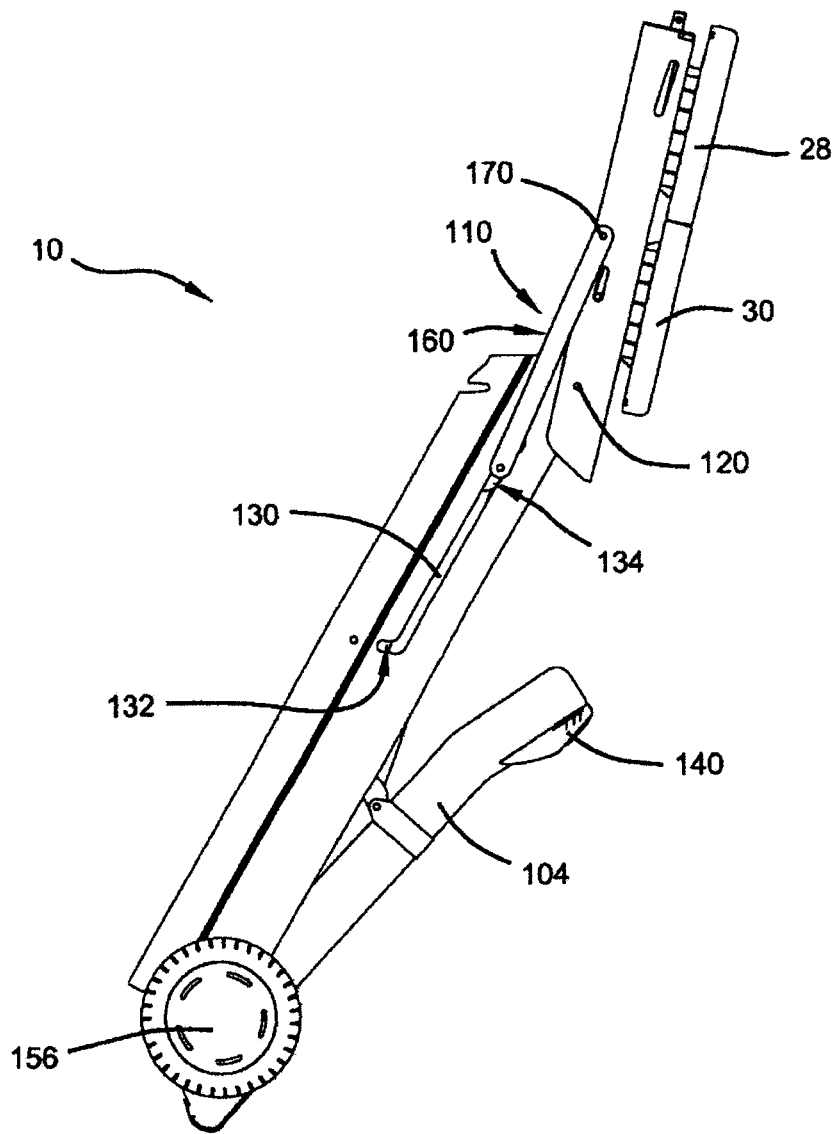
FIG. 4 is a side view of the workbench of FIG. 1 with the workbench being shown in a collapsed position.
Figure 5:
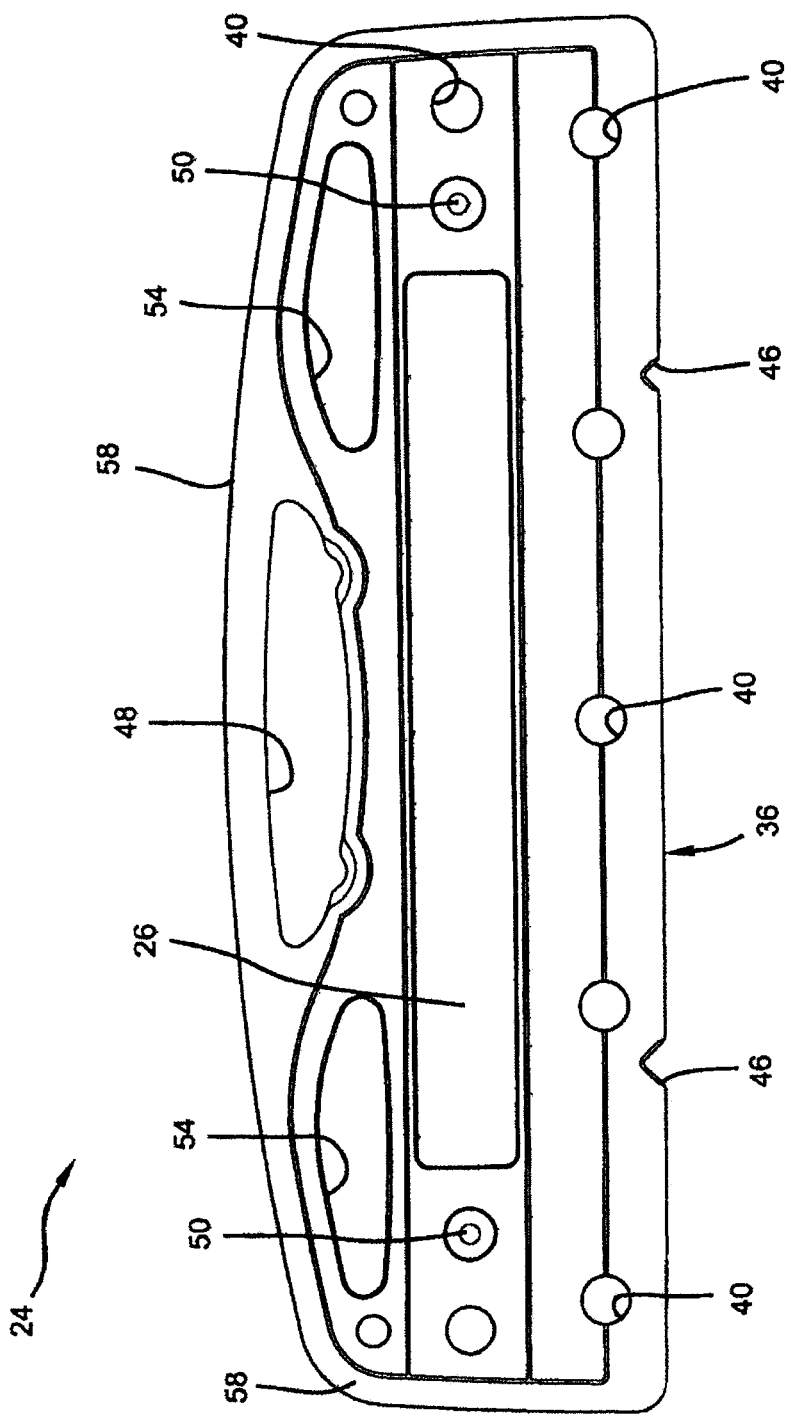
FIG. 5 is a top view of a top member of the workbench of FIG. 1.
Figure 6:
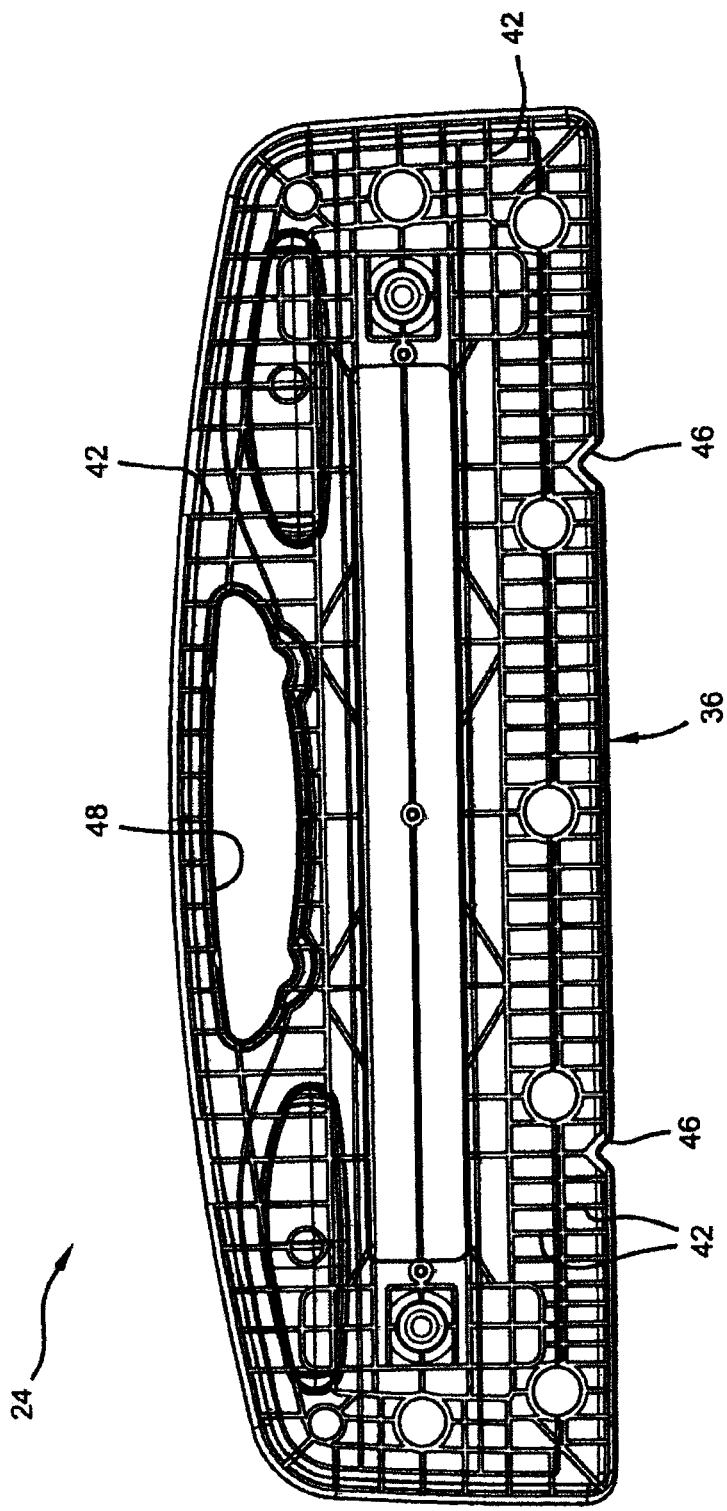
FIG. 6 is a bottom view of a top member.

With continued reference to FIGS. 1-4 and further reference to FIGS. 5 and 6, top structure 14 will be described in greater detail. Top structure 14 includes a pair of elongated mutually adjacent top members 24 including upper work supporting surfaces 26 lying generally in a common plane. Top members 24 are further defined by stationary member 28 and translating member 30. Top members 24 include longitudinally extending opposed side portions 36 defining clamping surfaces. As will be described in greater detail, translating member 30 is adjustable toward and away from stationary member 28 by way of a screw-type clamping device 38.

Top members 24 are preferably made of injection molded polypropylene. Each top member 24 includes molded thereon a plurality of bore sections 40 for durability. Bore sections 40 also accept accessory pegs (not shown) which increase the clamping range for larger workpieces. The underside of each top member 24 (FIG. 6) includes a plurality of rib sections 42 formed thereon for increased stability. Rib sections 42 are shown generally as rectangular portions but may also be arranged in other geometric shapes such as hexagonal for example. Opposing clamping detents 46 are formed along each opposed side portion 36. Clamping detents 46 provide a gripping function to locate a workpiece in a fixed location between the opposed side portion 36 or alternatively are arranged to accommodate extending portions of a workpiece. A handle 48 is integrally formed on an outer edge of each top member 24. A pair of blind bores 50 are arranged on each top member 24 for accepting fasteners to couple support structure 18 thereto.

Recessed portions 54 arranged on the outer corners of each top member 24 provide convenient locating areas for small parts such as fasteners and the like. The transition between work surface 26 and a peripheral edge 56 of top members 24 is defined by a radial contour 58. Radial contour 58 provides increased stability to the top structure 14 as a whole and is also accommodating to the touch.

Figure 7:
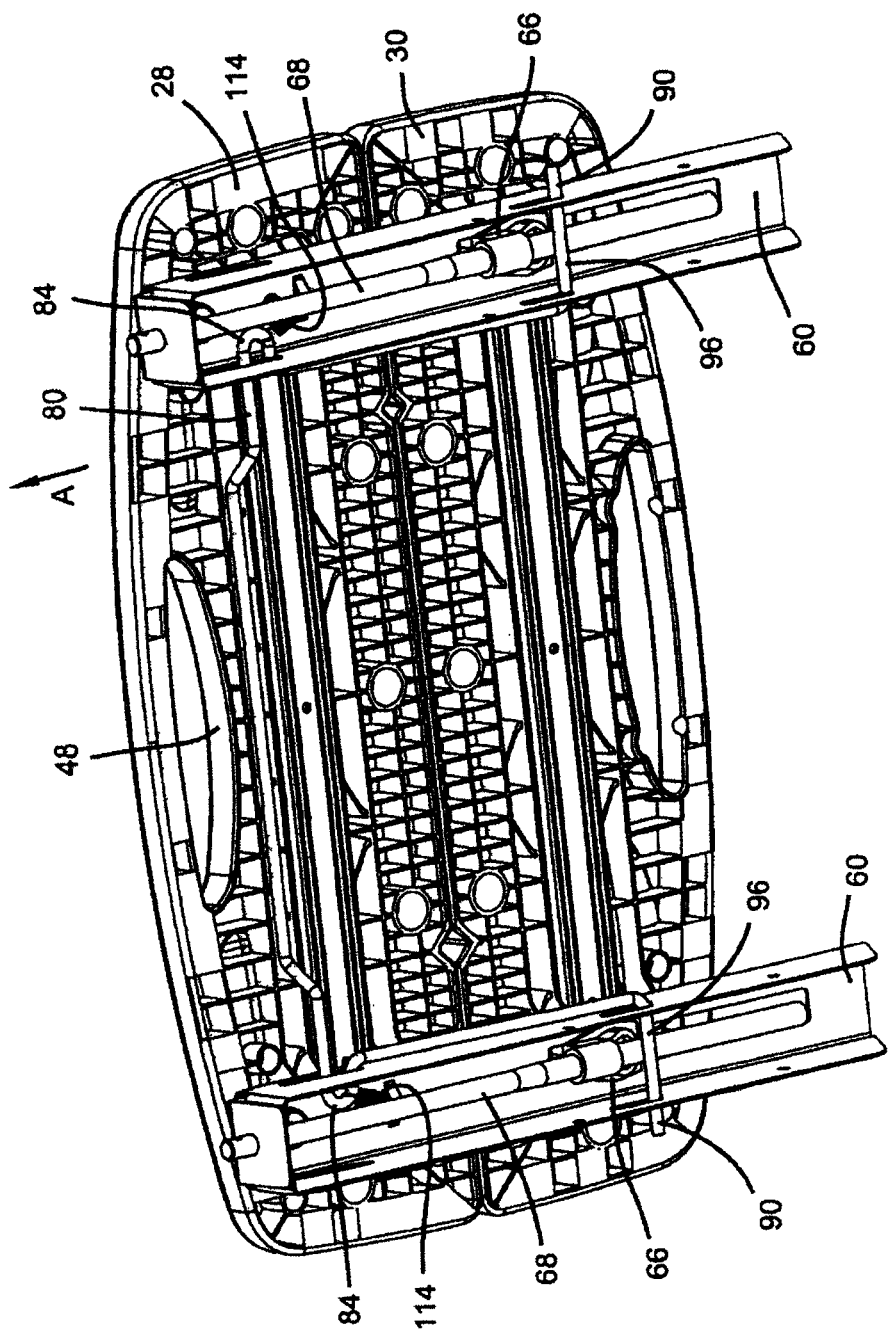
FIG. 7 is a bottom perspective view of the top structure and support structure of the workbench of FIG. 1.
Figure 8:
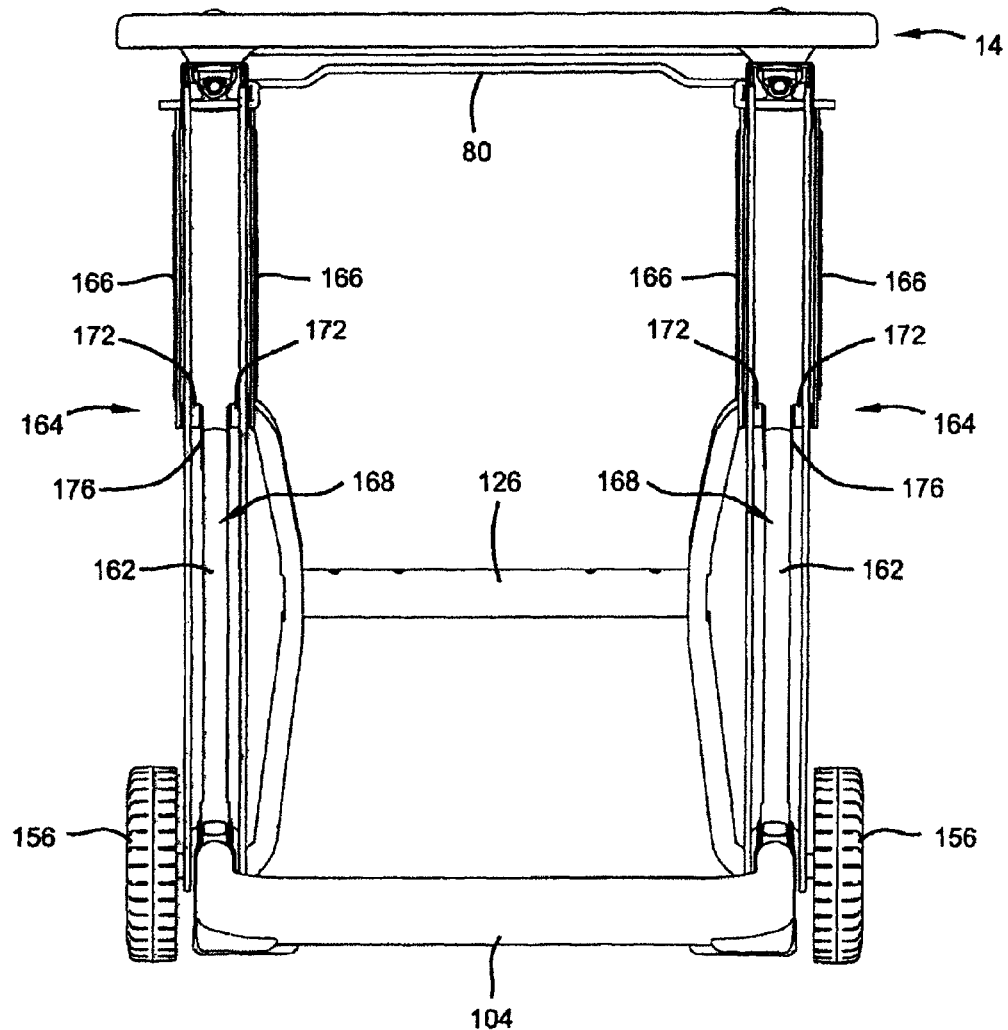
FIG. 8 is a rear view of the workbench of FIG. 1, with the workbench being shown in an raised position.

Turning now to FIGS. 7 and 9, support structure 18 will be described in greater detail. Support structure 18 includes a pair of generally C-shaped laterally disposed support members 60. Stationary member 28 is coupled through blind bores 50 to support members 60 at mounting bores 64 with conventional fasteners (not shown). Translating member 30 is coupled through respective blind bores 50 to mounting collars 66. Mounting collars 66 are threadably journalled around respective adjusting rods 68. Mounting collars 66 are guided along threads formed along adjusting rods 68 upon rotation of the adjusting rods 68. Adjusting rods 68 extend through a front passage 70 incorporated on each support member 60 and terminate at handles 72. Adjusting rods 68 cooperate with collars 66 to translate rotational movement of handles 72 into lateral movement of translating member 30 along support members 60. In this way, cutout portion 76 accommodates the linear movement of collar 66 therealong. Outer edges 78 of cutout portion 76 bound mounting collars 66 and define the maximum travel of translating member 30. It will be appreciated that other mechanical arrangements may be employed to translate top members 24 relative to each other in a clamping arrangement.

A handle or lever 80 is slidably coupled between support members 60 for releasing the collapsible frame 20 from a raised position to a collapsed position. Looped portions 84 are guided along opposing slots 86 arranged along a front portion 88 of support members 60. Similarly, the terminal ends 90 of lever 80 extend through and are guided along slots 92 incorporated on a central portion 94 of support members 60. As will be described in greater detail with respect to FIG. 10, latch portion 96 of lever 80 is urged toward engagement with notches 98 formed on legs 100 by biasing members 114. The cooperation of latch portions 96 with notches 98 maintains workbench 10 in a stable raised position. Biasing members 114 are coupled on a first end to loop portion 84 of lever 80 and a mounting extension 108 of support members 60 on a second end. Support members 60 are preferably made of a rigid material such as roll formed metal.

With reference now in general to FIGS. 1-19, collapsible frame 20 incorporating linkage mechanism 110 will be described. Collapsible frame 20 includes a pair of legs 100 pivotally extending between respective support structure 18 and a support base 104. Legs 100 are connected on upper ends to respective support structure 18 at support member pivot points 120. Similarly legs 100 are connected on lower ends to respective base support pivot points 122. In an raised working position (FIGS. 1 and 2), legs 100 separate top structure 14 and support base 104 into a parallel, spaced apart relationship. Legs 100 are laterally supported by cross brace 126. Cross brace 126 is shown having a generally U or C-shaped geometry however alternative arrangements may be employed. A slot 130 is incorporated on each leg 100 to guide linkage mechanism 110 between raised and collapsed positions. Slots 130 are preferably arranged in a J-shaped orientation whereby linkage mechanism 110 cooperates with a curved lower J-section 132 of slots 130 in a raised position and cooperates with a generally linear upper section 134 of slots 130 in a collapsed position.

Support base 104 includes ground engaging support pads 140 secured on outer corners 142. Ground engaging feet 146 extend at the leg, base intersection. Feet 146 each include an inwardly extending flange 150 providing added ground gripping capability. Each flange 150 includes gripping ridges 152 formed along an upper edge. In this way, a user may step on one or both flange 150 to provide increased workbench stability. Wheels 156 are rotatably coupled to legs 100 at the leg, base intersection. Wheels 156 are arranged such that they are laterally displaced away from the ground when workbench 10 is in a raised position. When workbench 10 is in a collapsed position and tilted toward wheels 156 at an angle with the ground, wheels 156 engage the ground to facilitate movement therealong. When workbench 10 is in a collapsed position and tilted away from wheels 156, the wheels 156 are precluded from ground engagement. In this way, workbench 10 may be tilted against a wall in a stable position with feet engaging the ground (FIG. 4).

Linkage mechanism 110 includes a pair of link members 160 operatively connecting support members 60 and legs 100. In addition, linkage mechanism 110 includes a pair of connecting members 162 operatively connecting support base 104 and legs 100. Each link member 160 generally includes an inboard and outboard slide arm 166. Slide arms 166 are coupled on a first end for pivotal movement to respective support members 60 at inboard and outboard pivot points 170. Slide arms 166 are coupled on a second end to respective inboard and outboard posts 172. Posts 172 extend through and are translatable along slots 130 formed along legs 100. Posts 172 are hingedly interconnected to first ends 164 of respective connecting members 162 by way of links 176. Second ends 168 of connecting members 162 are pivotally secured to link pivot joints 178 incorporated at mounting flanges 180 extending from support base 104.

The operation of linkage mechanism 110 will now be described in the context of moving the workbench 10 from a raised position (FIG. 1) to a collapsed position (FIG. 3). First, a user grasps lever 80 extending under stationary member 28 and actuates lever 80 in a direction toward the user defining a release direction (arrow A, FIG. 7). In a first method of operation, the user may place a first hand on a portion of the peripheral edge of stationary member 28 while actuating lever 80 with the other hand. In a second method of operation, the efficiency of linkage mechanism 110 allows a user to manipulate workbench 10 from a raised position to a collapsed position with one hand. Accordingly, a user would position a thumb around peripheral edge 56 of stationary member 28 and pull lever 80 in the release direction with the remaining fingers of the same hand.

Movement of lever 80 in the release direction disengages latch portions 96 of lever 80 from notches 98 on legs 100. The user subsequently rotates work surface 26 upward causing support members 60 to rotate about legs 100 at support member pivot points 120 (clockwise as viewed from FIG. 2). Rotational movement of support members 60 about pivot points 120 urges link members 166 upward along slots 130. Translation of link members 166 along slots 130 concurrently pulls the first ends 164 of connecting members 162 along the same path by way of the post and link arrangement. Translation of first ends 164 of connecting members 162 causes the second ends 168 of connecting members 162 to pivot about link pivot joints 178. Such movement urges support base 104 to rotate toward legs 100 about base pivot joints 122 (counterclockwise as viewed from FIG. 2). Rotation of top structure 14 continues until posts 172 engage terminal upper section 134 of slots 130.

To return the workbench 10 to a raised position from a collapsed position a user rotates top structure 14 counterclockwise as viewed from FIG. 4. Concurrently, link members 166 follow slot 130 toward J-section 132. Top structure 14 and support base 104 expand to the generally parallel relationship upon rotation about respective support member and base pivot points 120, 122. Each latch 96 of lever 80 slides along an outer front surface 182 of leg 100 near notch 98 until engaging notch 98. Biasing members 114 subsequently urge each latch 96 into notch 98 thereby achieving a locked raised position.

Figure 11:
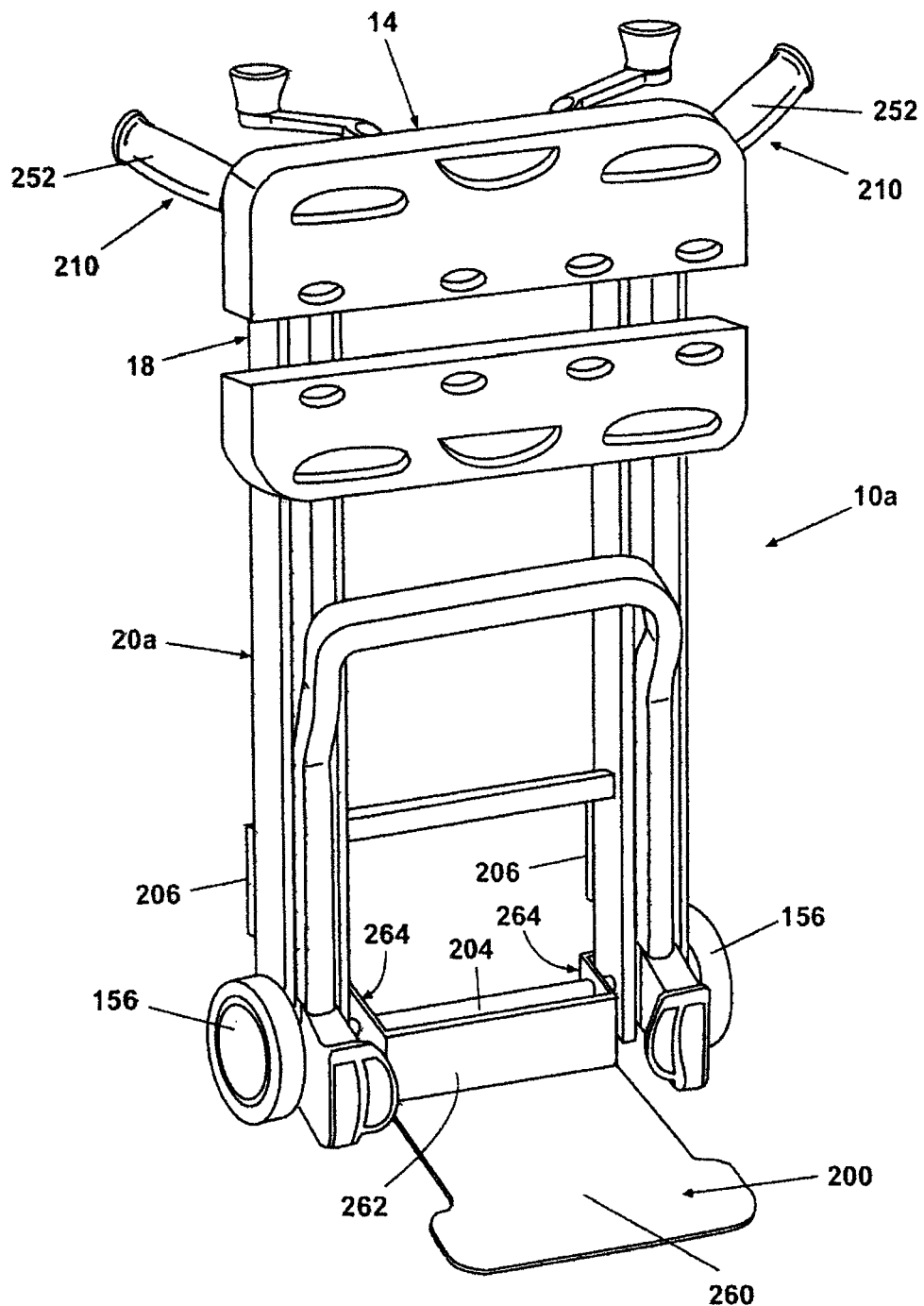
FIG. 11 is a perspective view of a second workbench constructed in accordance with the teachings of the present disclosure illustrating the workbench in a collapsed position and the toe plate in an extended position.

With reference to FIG. 11 of the drawings, a second portable collapsible workbench constructed in accordance with the teachings of the present disclosure is generally indicated by reference numeral 10*a*. The workbench 10*a* may include a top structure 14, a support structure 18, a collapsible frame 20*a*, and a toe plate 200. The top structure 14 and the support structure 18 may be generally similar or identical to the top structure 14 and the support structure 18, respectively, associated with the workbench 10 of FIG. 1 and as such, will not be discussed in further detail herein.

In the particular example provided, the collapsible frame 20*a* is generally similar to the collapsible frame 20 of FIG. 1. In the embodiment shown, the collapsible frame 20*a* differs from the collapsible frame 20 only in the use of a continuous axle shaft 204, as well as the inclusion of a pair of skid plates 206. Additionally, one or more handle assemblies 210 are preferably employed to control the workbench 10*a* when it is employed as a hand truck.

In contrast to the embodiment of FIG. 1, which employs discrete axle shafts 156 (FIG. 8) for each of the wheels 156, the exemplary embodiment illustrated employs a single, continuous axle shaft 204 that interconnects the wheels 156 and rotatably couples the wheels 156 to the remainder of the collapsible frame 20*a*. The axle shaft 204 may serve as mount to which the toe plate 200 is rotatably mounted, as will be described in greater detail, below.

The skid plates 206 may be formed from a wear resistant material with a relatively low coefficient of friction, such as nylon, ABS, polyethylene or UHMW, and are configured to reduce the potential for damage when the workbench 10*a* is employed as a hand truck and the support base 104 is pulled against a surface, such as the edge of a stair tread.

Figure 19:
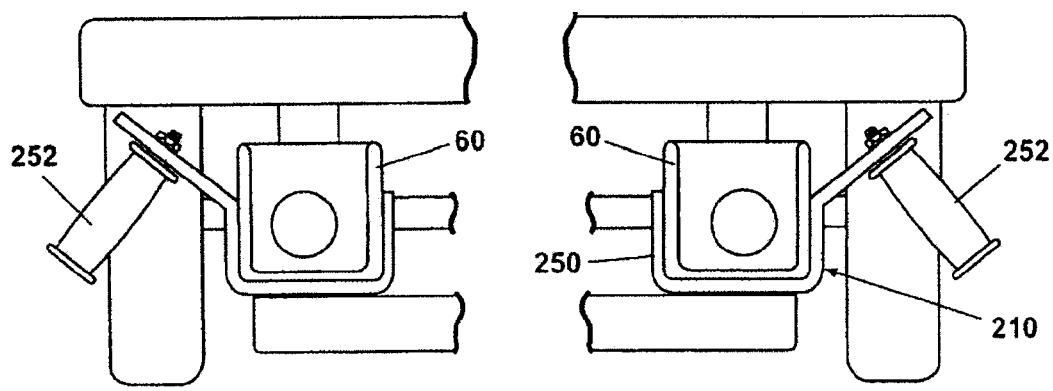
FIG. 19 is a top view of a portion of the workbench of FIG. 11 illustrating the configuration of the handle assemblies in greater detail.

With additional reference to FIG. 19, each of the handle assemblies 210 is illustrated as including a mounting bracket 250 and a handle 252. The mounting bracket 250 is fixedly coupled to an associated one of the C-shaped laterally spaced-apart support members 60 to thereby provide a compact yet strong means for mounting an associated one of the handles 252. Each handle 252 may be fixedly coupled to the mounting bracket in an orientation that permits the handles 252 to be comfortably grasped when the workbench 10*a* is employed as a hand truck. Preferably, the handle assemblies 210 are configured such that the handles 252 do not interfere with the operation and use of the workbench 10*a* when the workbench 10*a* is positioned in the raised position. In view of this disclosure, those skilled in the art will understand that the handle assemblies 210 may be configured somewhat differently. For example, the handle assemblies 210 may be configured such that each handle 252 is pivotally or telescopically coupled to the support structure 18 so that they may be rotated or translated between an extended position and a retracted position.

Figure 12:
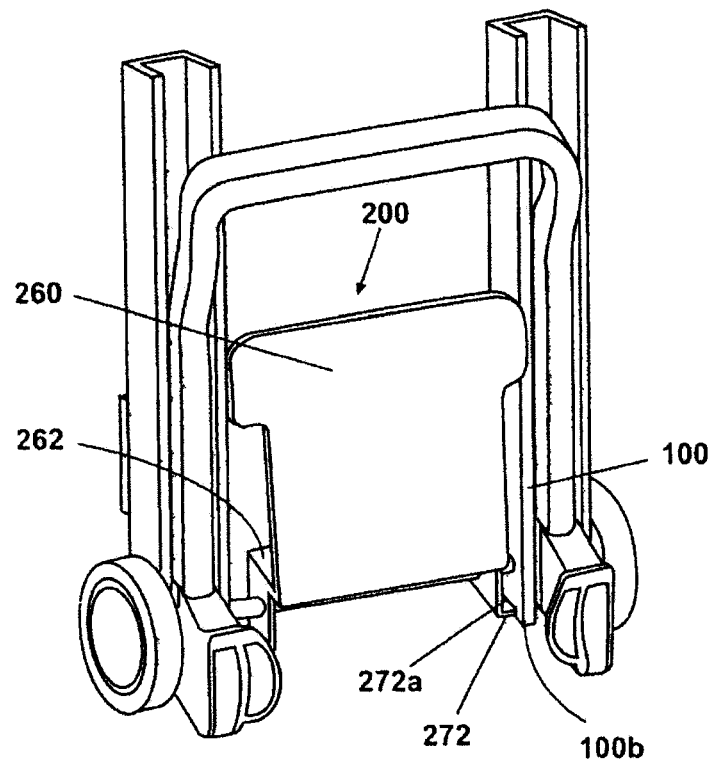
FIG. 12 is a perspective view of a portion of the workbench of FIG. 11 illustrating the toe plate in a retracted position.

In FIGS. 11 and 12, the toe plate 200 is illustrated as including first and second plate portions 260 and 262, respectively, and a pair of mounting trunnions 264 that may be disposed on the opposite lateral sides of the second plate portion 262. In the example shown, the toe plate 200 is unitarily formed form an appropriate material, such as steel plate. The first and second plate portions 260 and 262 are arranged generally perpendicular to one another.

Figure 13:
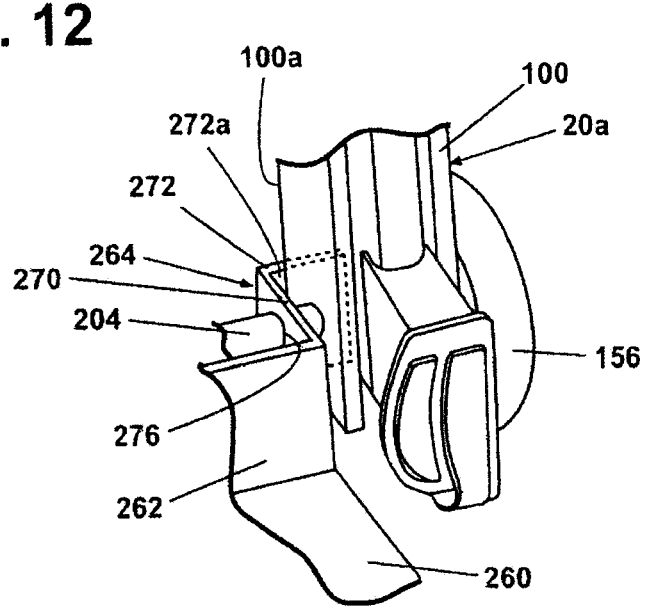
FIG. 13 is an enlarged view of a portion of FIG. 11 illustrating the connection between the toe plate and the collapsible frame in greater detail.
Figure 14:
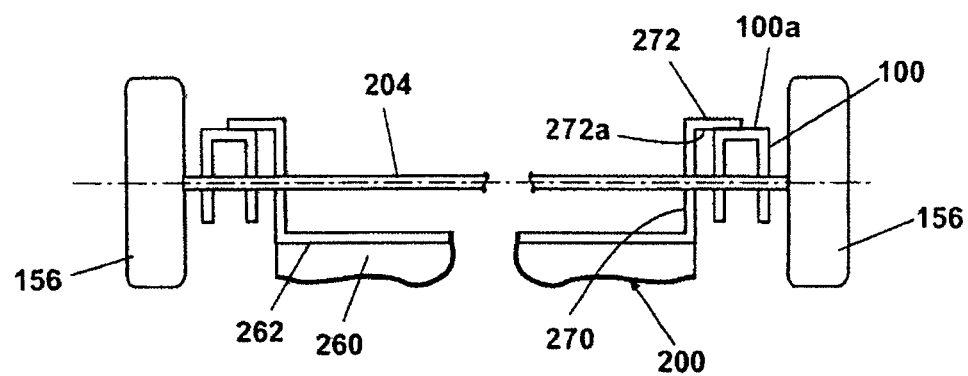
FIG. 14 is a schematic view of a portion of the work bench of FIG. 11 illustrating the use of an axle shaft for the common mounting of the wheels and the toe plate to the collapsible frame.

With additional reference to FIGS. 13 and 14, the trunnions 264 are illustrated as being generally L-shaped, having a leg portion 270 and a base portion 272. The forward end of the leg portion 270 is coupled to the second plate portion 262 while the rearward end of the leg portion is coupled to the base portion 272. A mounting aperture 276 is formed through the leg portion 270 and is configured to receive the axle shaft 204 therethrough. Accordingly, the axle shaft 204 rotatably couples the trunnions 264 to the collapsible frame 20a. The base portion 272, which extends away from the leg portion 270 in a direction away from the second plate portion 262, acts as a stop to inhibit rotation of the trunnion 264 about the axle shaft 204. More specifically, contact between the front face 272a of the base portion 272 and the side 100a of an associated one of the legs 100 inhibits the rotation of the toe plate 200 in a first rotational direction beyond the lowered condition that is illustrated in FIGS. 11 and 13, while contact between the front face 272a of the base portion 272 and the end 100b of an associated one of the legs 100 inhibits rotation of the toe plate 200 in an opposite rotational direction beyond the raised condition that is illustrated in FIG. 12.

Figure 15:
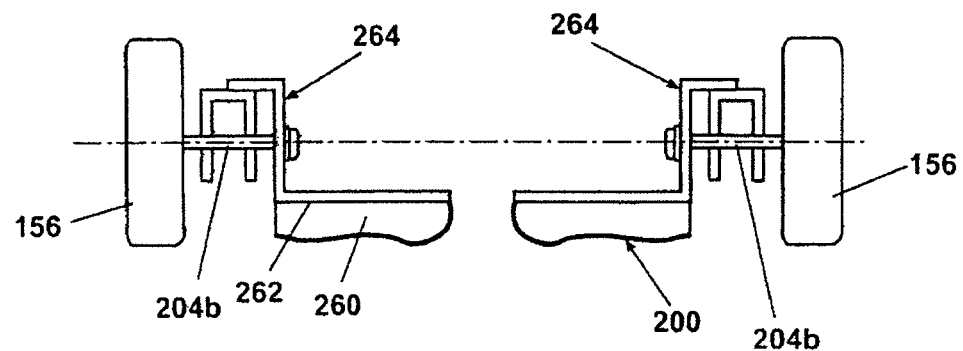
FIGS. 15 and 16 are schematic views that are similar to FIG. 14 but which illustrate alternate mountings of the wheels and the toe plate to the collapsible frame.
Figure 16:
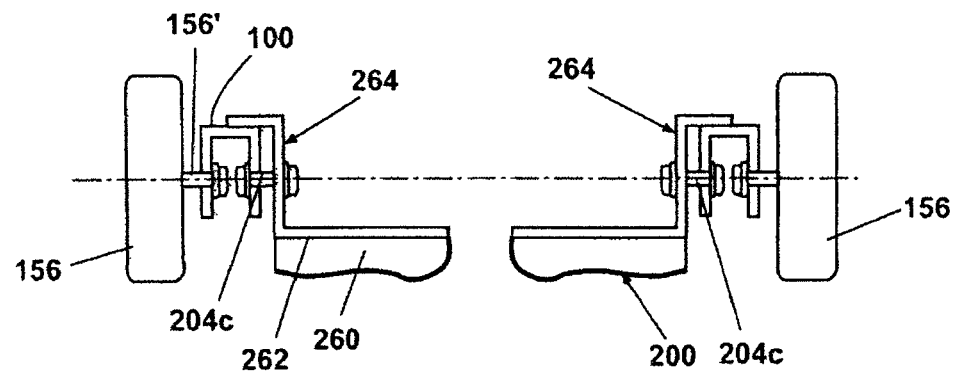

While the workbench 10a has been described thus far as including an axle shaft 204 that runs between a pair of laterally spaced-apart wheels 156 to support the toe plate 200, those skilled in the art will appreciate that the disclosure, in its broader aspects, may be constructed somewhat differently. For example, separate axle shafts 204b may be employed as shown in FIG. 15, with each axle shaft 204b supporting one of the wheels 156 and one of the trunnions 264. Alternatively, the separate and distinct axle shafts 156' and 204c may be employed to support the wheels 156 and the trunnions 264, respectively, as shown in FIG. 16.

Figure 17:
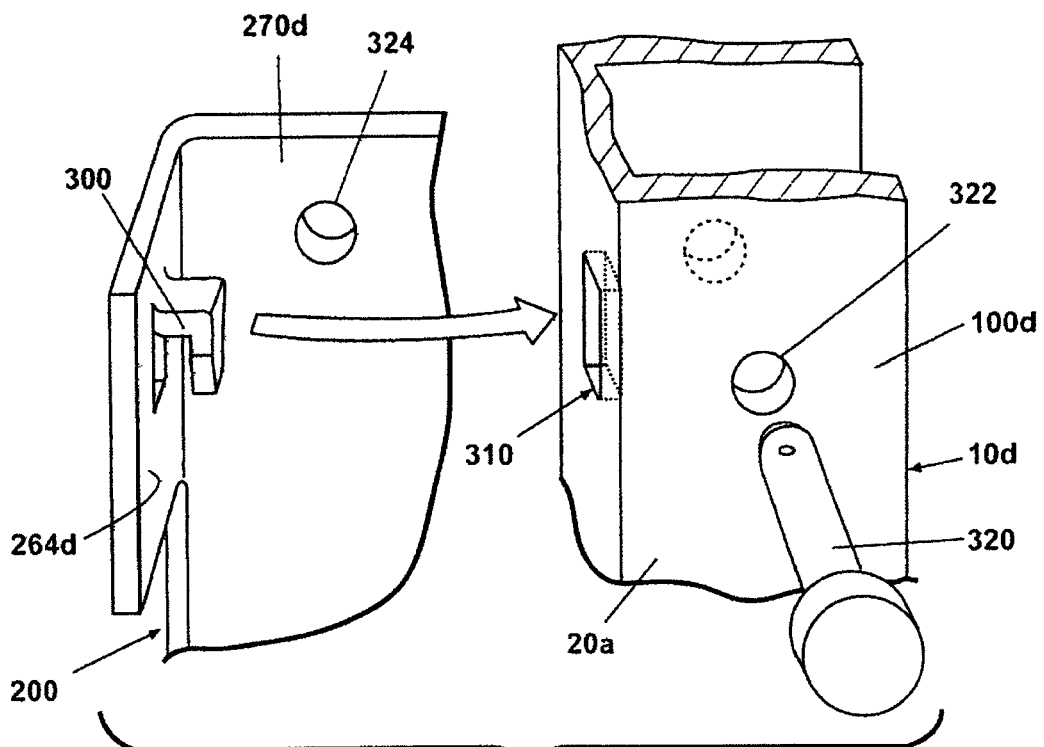
FIG. 17 is an exploded view illustrating an alternate mounting of the toe plate to the collapsible frame.
Figure 18:
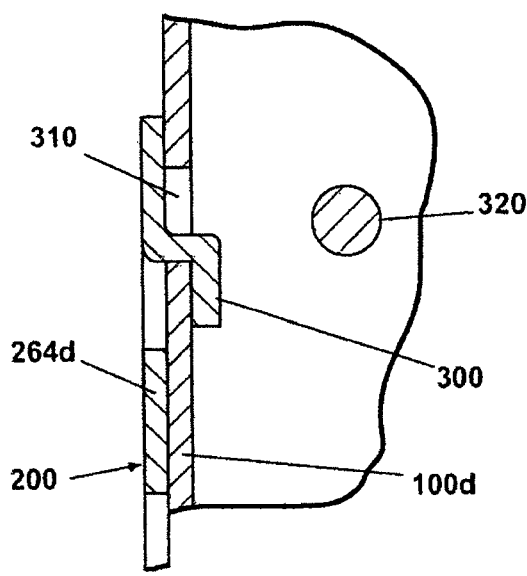
FIG. 18 is a section view taken through the toe plate and collapsible frame of FIG. 17.

As a further example, the toe plate 200 may be detachably coupled to the remainder of the workbench 10d, as shown in FIGS. 17 and 18. In this example, each trunnion 264d includes a mounting barb 300 that extends through a mounting hole 310 that may be formed in the leg 100d of the collapsible frame 20a to permit the toe plate 200 to be removably coupled to the collapsible frame 20a. An optional lock pin 320, which may be a commercially available detent pin such as the type that is manufactured by Carr-Lane Manufacturing Company, may be employed to further secure the toe plate 200d to the workbench 10d in a desired location and/or orientation. More specifically, the lock pin 320 is inserted through apertures 322 and 324 that are formed through the leg 100d and the base portion 270d of the trunnion 264d, respectively.

With reference to FIGS. 20 through 23, in another preferred embodiment of the present disclosure, a portable workbench and lift truck assembly 400 generally includes a top structure 402 defining a work surface 403, a lift truck structure 404, and a collapsible frame 406. Top structure 402 further includes at least a first top member 408, a second top member 410, and a third top member 412. Top members 408, 410 and 412 similar to top members previously noted herein are preferably made of an injection molded polypropylene material, however additional polymeric materials can be used as well as wood, metal, etc. Top structure 402 is collectively connectible to a first support structure 414 and a second support structure 416, respectively.

First and second wheels 418, 420 are provided adjacent lift truck structure 404 and provide portability for workbench and lift truck assembly 400. Lift truck structure 404 further includes a toe plate 422 and a release member 424.

Collapsible frame 406 further includes first and second outer legs 426, 428 and first and second inner legs 430, 432, respectively. First and second inner legs 430, 432 are positioned between and rotatably joined to first and second outer legs 426, 428, respectively. A first cross brace 434 connectably joins each of first and second outer legs 426, 428. A pair of fasteners 436, 437 rotatably join each of first and second outer legs 426, 428 to first and second inner legs 430, 432, respectively. Fasteners 436, 437 permit both rotation and translation of first and second inner legs 430, 432 with respect to first and second outer legs 426, 428. A second cross brace 438 and a third cross brace 440 join distal ends of first inner leg 430 to second inner let 432. In addition, a cross brace housing 442 is substantially centrally positioned and connectably joined to each of first and second inner legs 430, 432.

Materials for first and second outer legs 426, 428, first and second inner legs 430, 432, first cross brace 434, second cross brace 438 and cross brace housing 442 are preferably manufactured from a metal material such as steel or aluminum, however with appropriate joining methods can be selectively made of alternate materials such as polymeric materials. First cross brace 434, second cross brace 438 and third cross brace 440 are preferably connected by welding.

Figure 20:
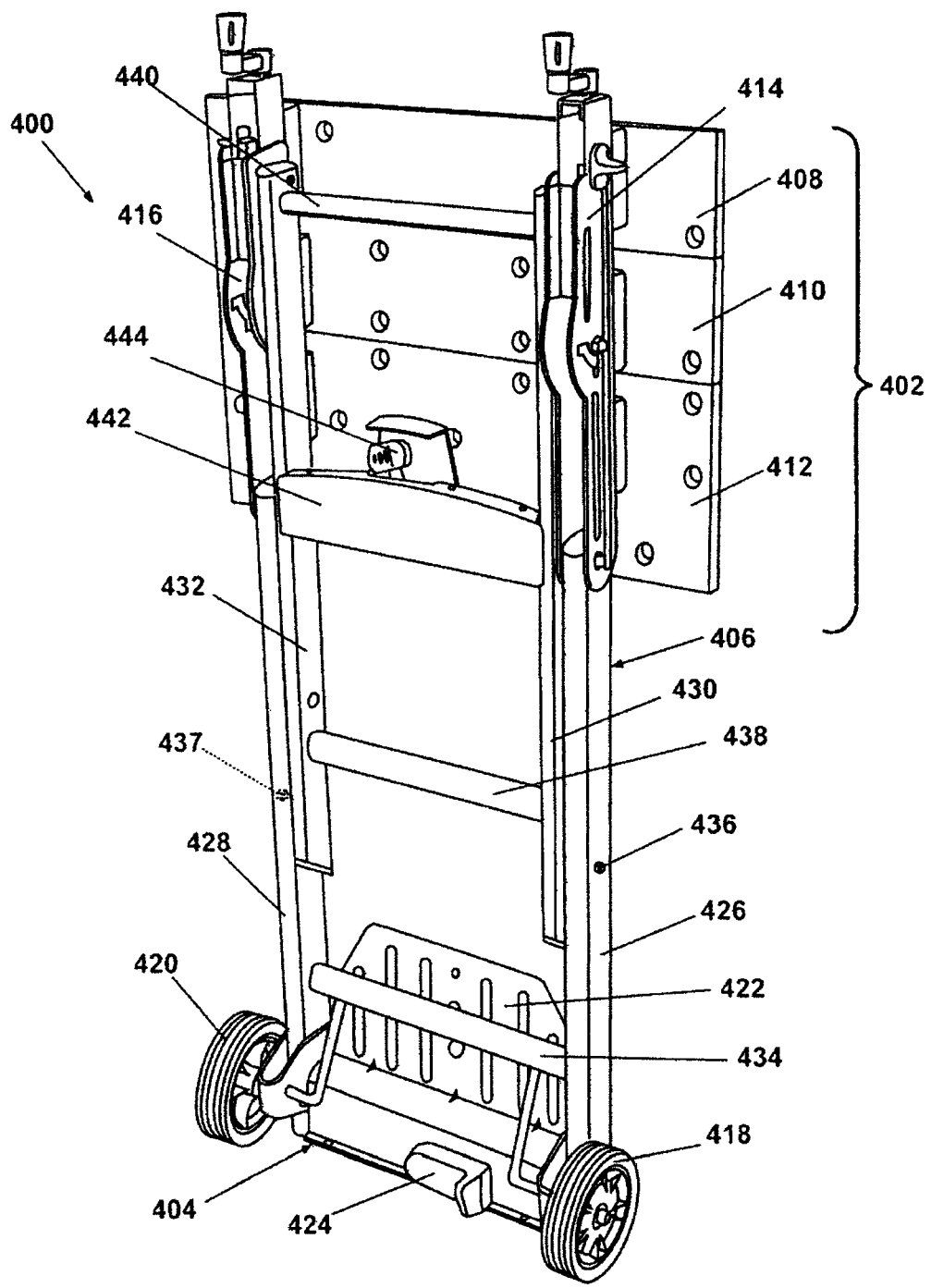
FIG. 20 is a rear perspective view of a workbench with hand truck constructed in accordance with another aspect of the teachings of the present disclosure, the workbench with hand truck being shown in a raised position.
Figure 21:
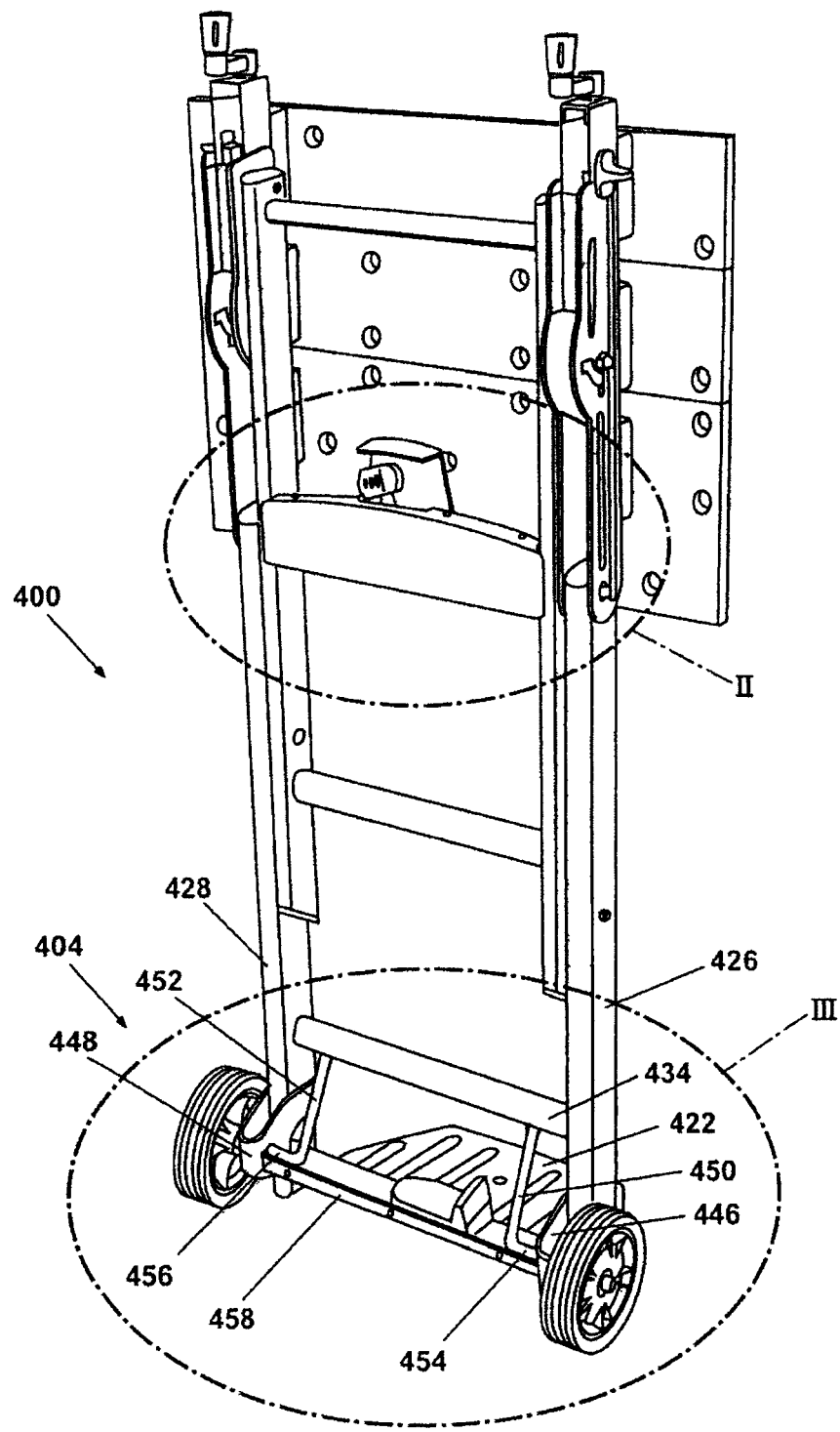
FIG. 21 is a rear perspective view similar to FIG. 20 with the workbench with hand truck being shown in a hand truck position.
Figure 22:
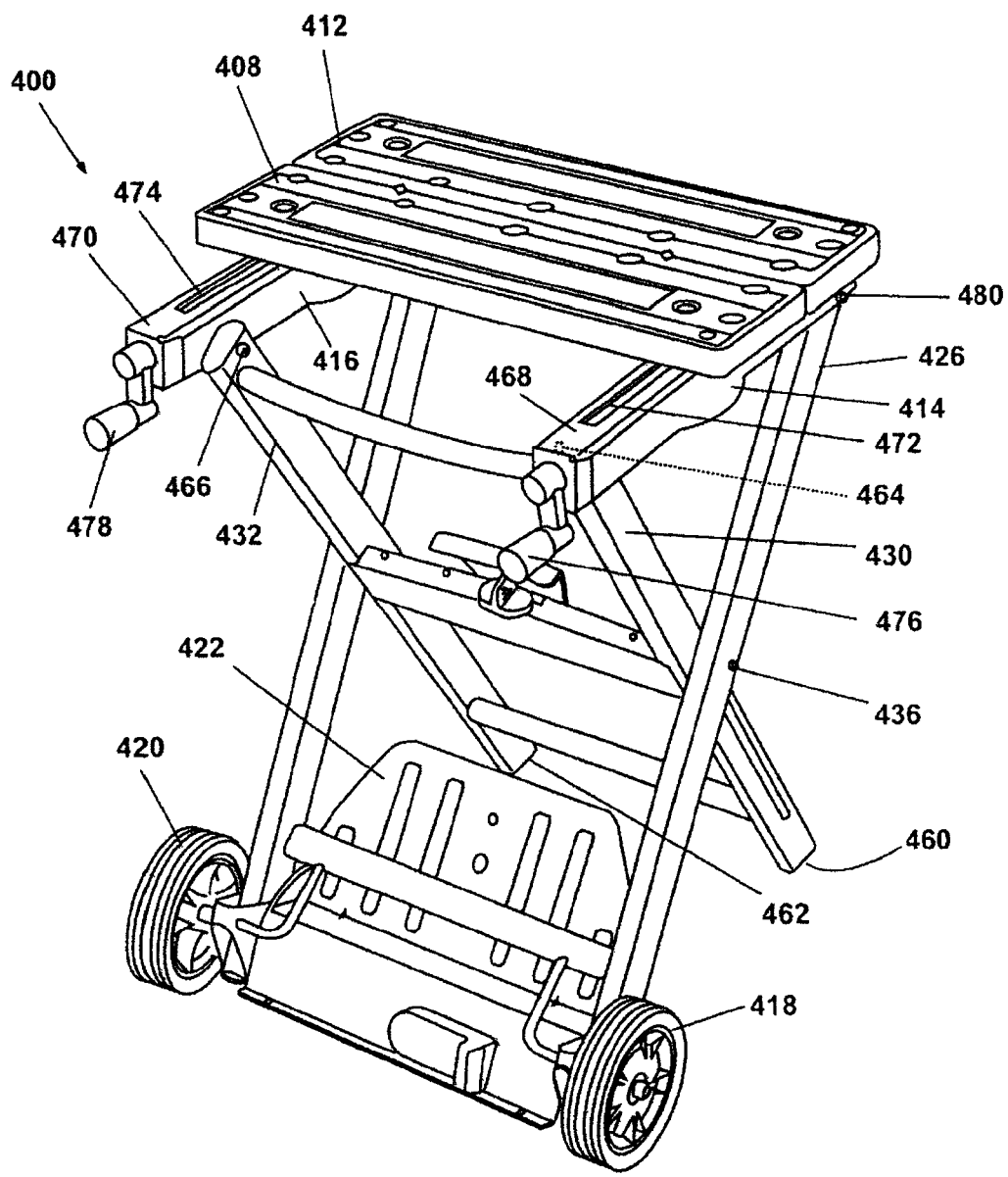
FIG. 22 is a perspective view similar to FIG. 20 with the workbench with hand truck being shown in a workbench operable position.

Portable workbench and lift truck assembly 400 is movable between three basic positions. A collapsed or substantially longitudinal position is shown in FIG. 20. A hand truck position having toe plate 422 locked at an angle to collapsible frame 406 in an extended position is shown in FIG. 21. In one preferred embodiment the angle is substantially 90 degrees from a longitudinal axis of the collapsible frame 406 shown in FIG. 21. A raised position having top structure 402 position substantially horizontal to a ground surface is shown in FIG. 22. In the raised position of portable workbench and lift truck assembly 400, toe plate 422 is positioned in a retracted or upright position and latched similar to the collapsed position. To release portable workbench and lift truck assembly 400 from the collapsed position shown in FIG. 20, a release lever 444 is provided which is rotatably connectible to cross brace housing 442. Release lever 444 is rotated to permit changing from the collapsed to the raised position. To release toe plate 422 from either the upright position or the hand truck position, release member 424 is displaced to unlatch toe plate 422 permitting rotation of toe plate 422 between the collapsed position and the lift plate position show in FIG. 21.

As best seen in FIG. 21, lift truck structure 404 further includes first and second U-shaped brackets 446, 448. U-shaped brackets 446, 448 are used to connectably join first and second wheels 418, 420 and toe plate 422 to a distal end of each of first and second outer legs 426, 428. A first brace rod 450 and a second brace rod 452 are connected between first cross brace 434 and each of first and second U-shaped brackets 446, 448, respectively. First and second brace rods 450, 452 are preferably welded to both first cross brace 434 and first and second U-shaped brackets 446, 448. First brace rod 450 also includes a first support end 454. Similarly, second brace rod 452 includes a second support end 456. First and second supports ends 454, 456 provide additional abutment support to an end wall 458 connected to toe plate 422, when toe plate 422 is in the lift truck position shown in FIG. 21.

Referring specifically to FIG. 22, it is initially noted that second top member 410 has been removed for clarity. First and third top members 408, 412, can be displaced relative to each other but in this example are shown abutting with each other. In the raised position shown, both first and second wheels 418, 420 and each of a distal end 460 and a distal end 462 of first and second inner legs 430, 432, respectively, provide a four point contact with the ground surface. As viewed in FIG. 22, an upper end of both first and second inner legs 430, 432 rotatably connect via fasteners 464 and 466, respectively, to first and second support structures 414 and 416. Top members 408, 412 are directly supported by each of a surface 468 and a surface 470 of first and second support structures 414, 416, respectively. Fasteners inserted through each of a slot 472 and a slot 474, slidably support at least first top member 408. A handle 476 is rotatably connectible to first support structure 414. Similarly, a handle 478 is rotatably connectible to second support structure 416. A pair of fasteners 480 (only one of which is visible in FIG. 22) rotatably connect an upper end of each of first and second outer legs 426 and 428 to first and second support structures 414 and 416, respectively.

Figure 23:
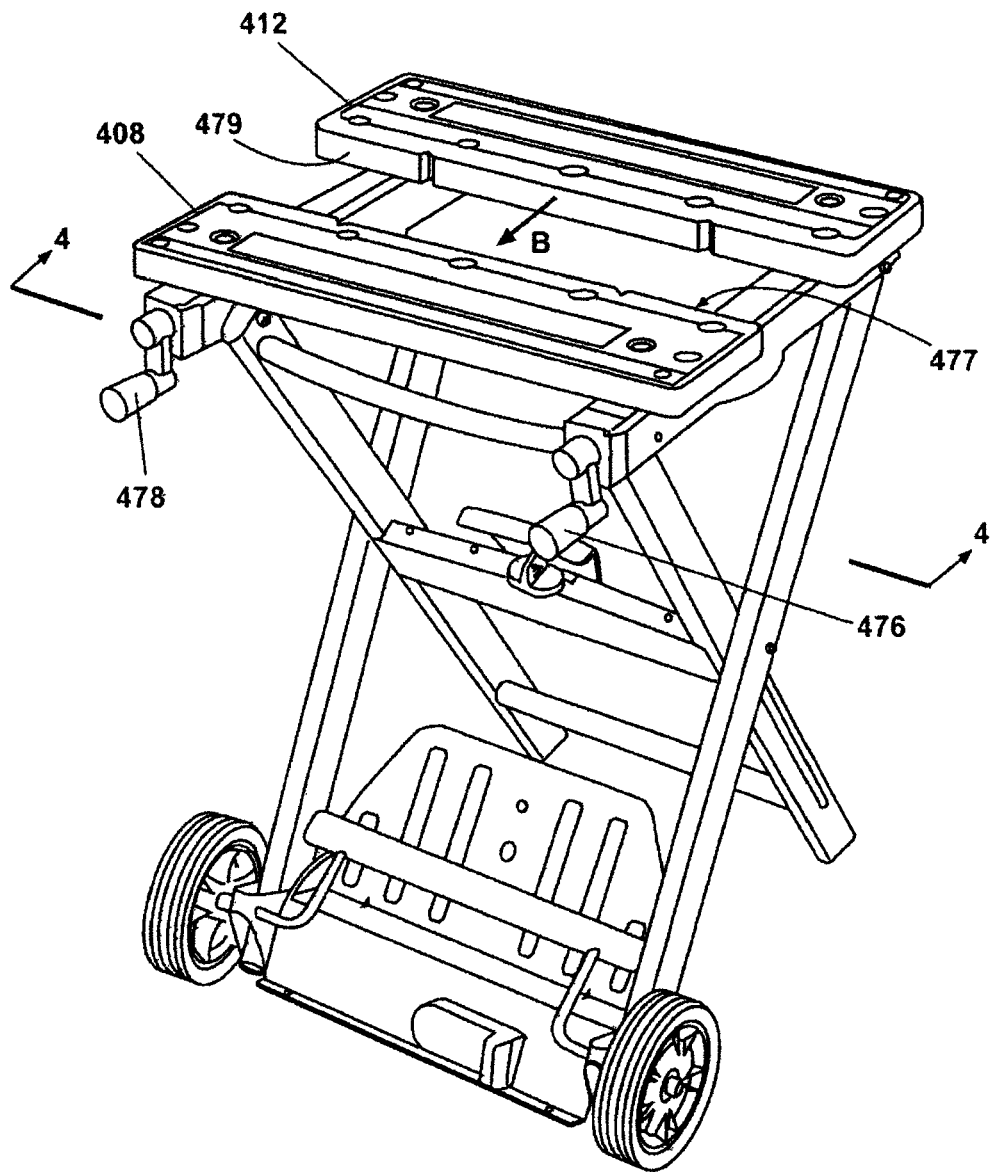
FIG. 23 is a perspective view similar to FIG. 22 with the workbench with hand truck being shown in a workbench open position.

The purpose for handles 476 and 478 is to provide by rotation in either a clockwise or a counterclockwise direction a horizontal translation of an adjacent one of the top members. An exemplary translation of first top member 408 is shown in FIG. 23 which results from rotation of handles 476 and 478 such that first top member 408 translates in the opening direction indicated by arrow "B" with respect to third top member 412. Top members 408 and 412 include opposing side portions 477 and 479 defining clamping surfaces.

Figure 24:
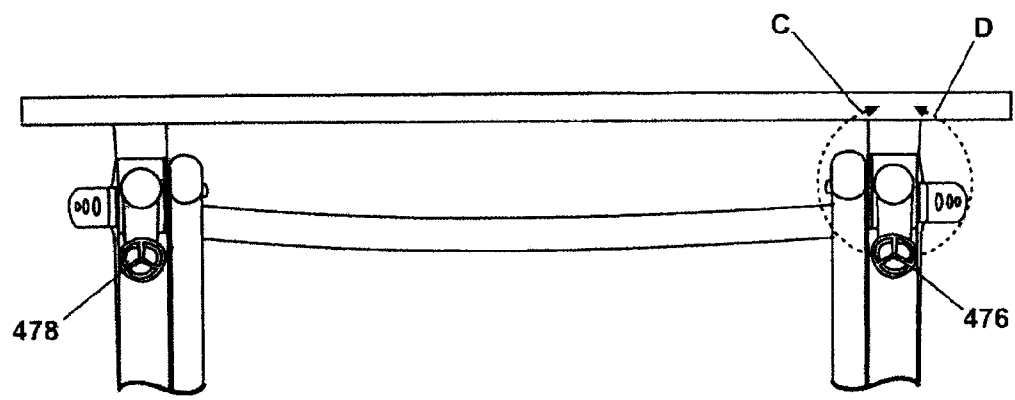
FIG. 24 is a partial rear elevational view taken at elevation 4-4 of FIG. 23.

Referring now to FIG. 24, exemplary rotation paths in a clockwise direction "C" and a counterclockwise direction "D" are shown for handle 476. Similar rotation paths for handle 478 are also used.

Figure 25:
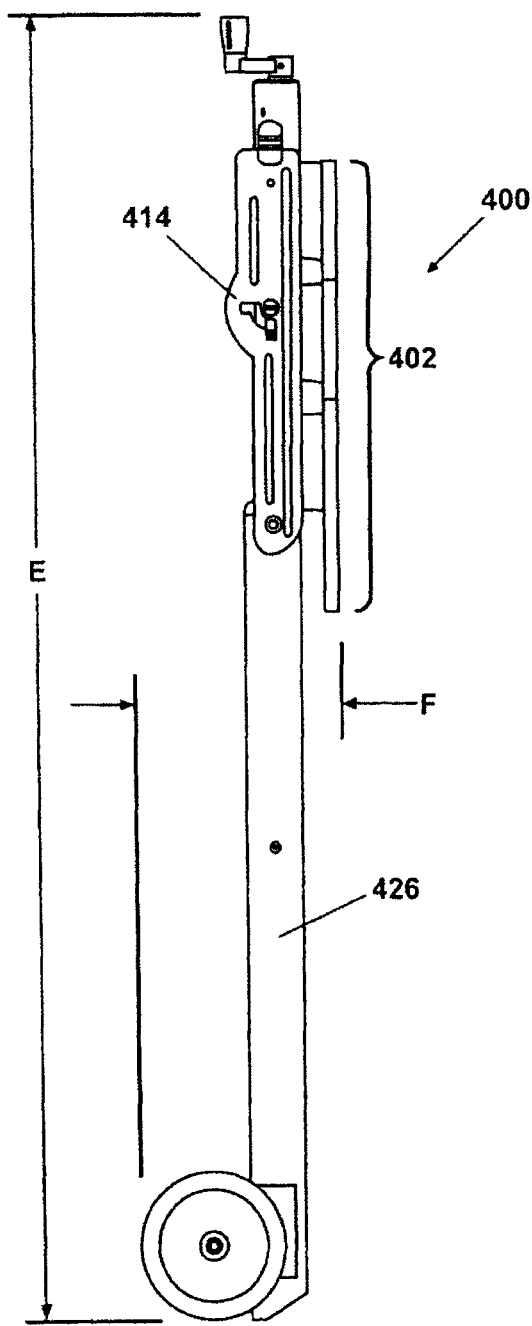
FIG. 25 is a side elevational view taken at elevation 5-5 of FIG. 20.

Referring next to FIG. 25, in the collapsed position of portable workbench and lift truck assembly 400, a total assembly height "E" is provided as well as a total collapsed width "F". As best seen in this view, top structure 402 and first support structure 414 (second support structure 416 is not visible in this view) are both substantially parallel with first outer leg 426. The collapsed position is also used for transportation of portable workbench and lift truck assembly 400 using first and second wheels 418, 420. Aligning the components of portable workbench and lift truck assembly 400 in a generally longitudinal configuration for the collapsed position minimizes the total collapsed width "F" and provides for easy storage of portable workbench and lift truck assembly 400.

Figure 26:
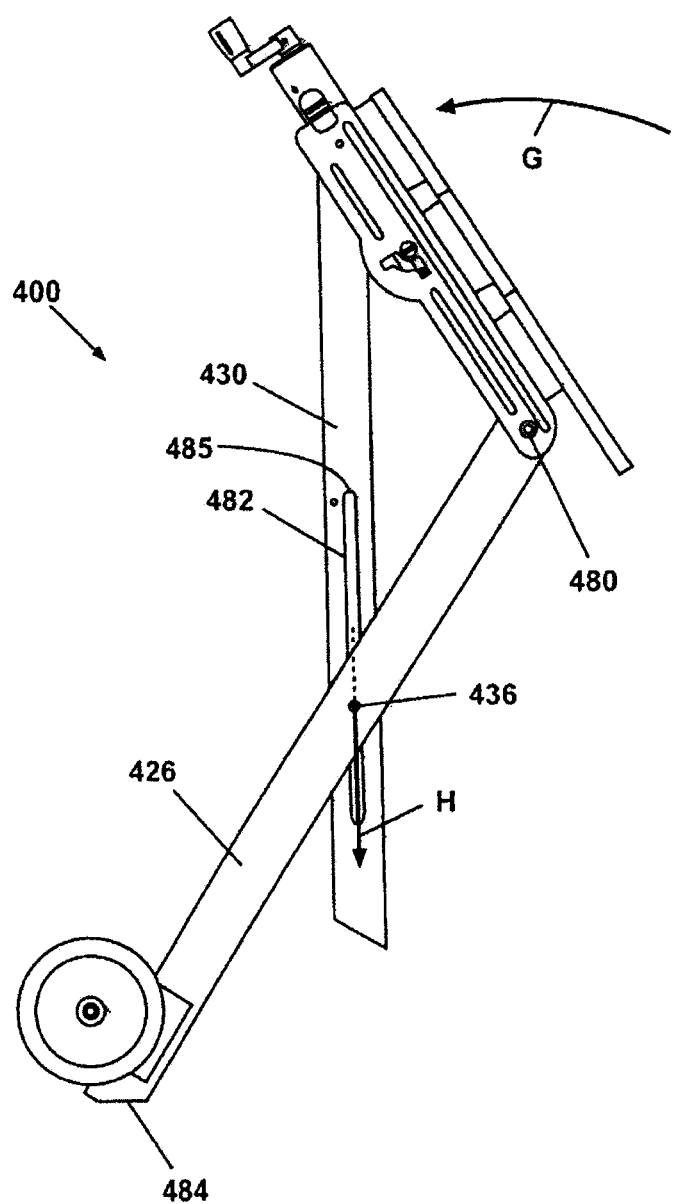
FIG. 26 is a side elevational view of the workbench with hand truck of the present disclosure showing a partially rotated configuration between the raised and workbench operable positions.

As best seen in FIG. 26, to change between the collapsed and raised positions of portable workbench and lift truck assembly 400, release lever 444 is first repositioned from the biased position shown in FIG. 20. After release lever 444 is repositioned, top structure 402 can be rotated about fastener pair 480 about a rotation arc "G". As top structure 402 rotates about an axis of rotation formed through fasteners 480, fasteners 436 and 437 guide each of first and second inner legs 430 and 432 in a sliding direction "H". Fasteners 436 and 437 are slidably disposed within a slot 482 formed in each of first and second inner legs 430 and 432 (second inner leg 432 is not visible in this view). To provide stability during this rotation procedure, a base end 484 is provided at distal ends of each of first and second outer legs 426 and 428. Base ends 484 prevent contact of either first or second wheels 418 or 420 with the ground, thus providing a stable contact for portable workbench and lift truck assembly 400 during the rotation phase.

Figure 27:
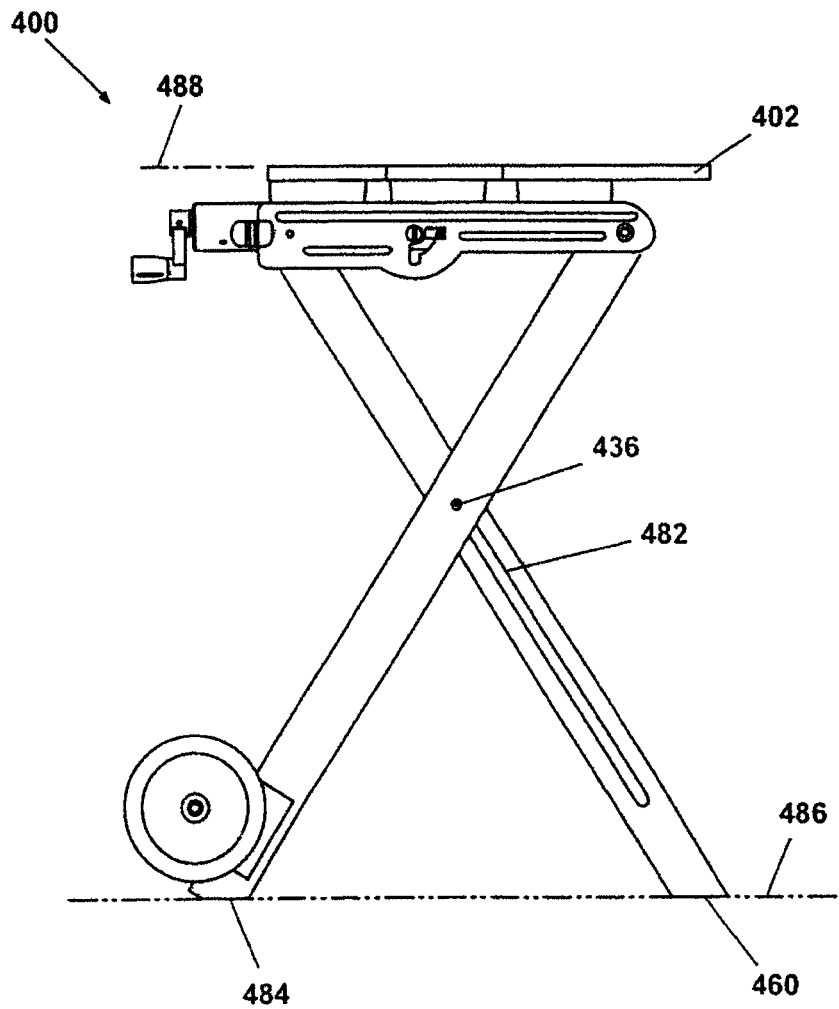
FIG. 27 is a side elevational view of the workbench operable position of FIG. 22.

As seen in FIG. 27, when top structure 402 has rotated about rotation arc "G" until fasteners 436 contact a slot distal end 485 (shown in FIG. 26) of slots 482, collapsible frame 406 substantially forms an X shape as shown. In the raised position, each of the base ends 484 and the distal ends 460 and 462 contact the ground surface forming a plane 486. In this position, top structure 402 is positioned parallel to a plane 488 which is substantially parallel to plane 486, thus providing a flat work surface for top structure 402.

Figure 28:
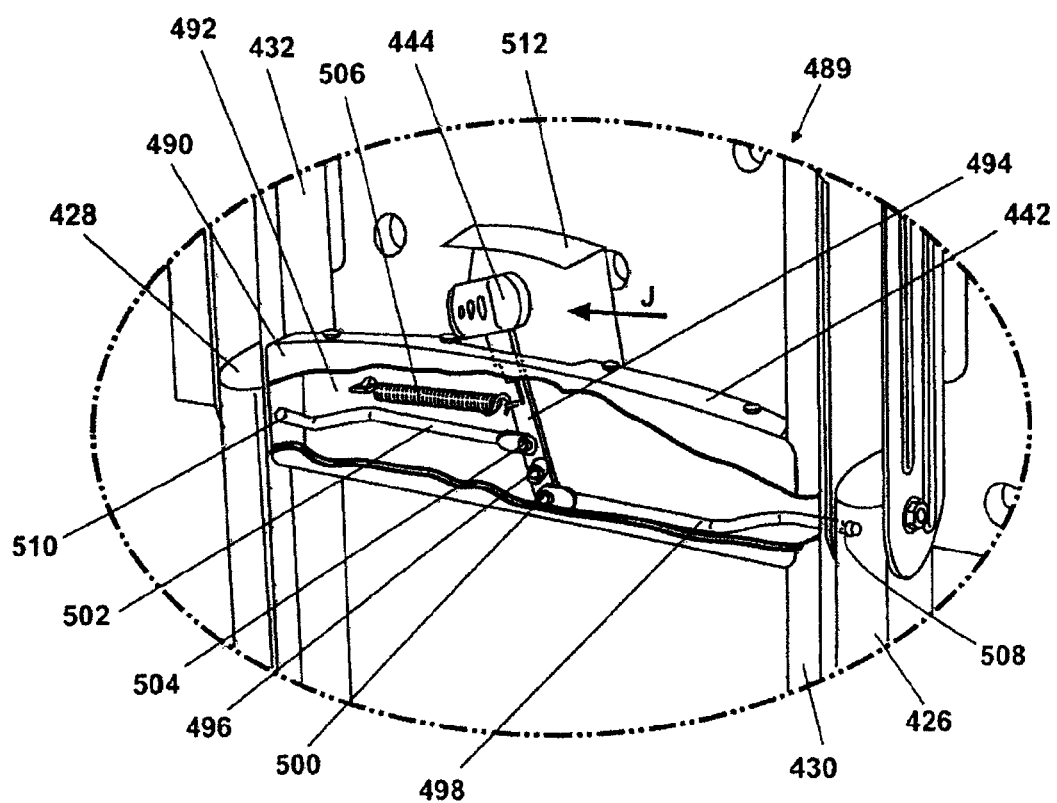
FIG. 28 is a rear perspective partially sectioned view of the cross member release mechanism in an engaged position.

A latch mechanism 489 associated with release lever 444 is substantially enclosed within a first housing wall 490 and a second housing wall 492 of cross brace housing 442. Release lever 444 is connected to a lever arm 494. Lever arm 494 is rotatably connected to second housing wall 492 via a pin 496. A first rod 498 is rotatably connected to lever arm 494 at a distal end via a fastener 500. A second rod 502 is rotatably connectible to lever arm 494 above pin 496 as seen in FIG. 28 via fastener 504. A biasing element 506 normally biases release lever 444 in a biasing direction of arrow "J". Biasing element 506 is connected between lever arm 494 and second housing wall 492. In the latched position shown, first rod 498 is biased by biasing element 506 into sliding engagement within an aperture 508 formed within first outer leg 426. Similarly, second rod 502 is biased into sliding engagement within an aperture 510 formed within second outer leg 428. Latched engagement of first rod 498 and second rod 502 prevents rotation of first and second outer legs 426, 428 relative to first and second inner legs 430, 432, which therefore latches portable workbench and lift truck assembly 400 in the collapsed position. A guard 512 is connectably joined to second housing wall 492 and is positionable between release lever 444 and top structure 402. Guard 512 prevents inadvertent contact with and release of release lever 444.

Figure 29:
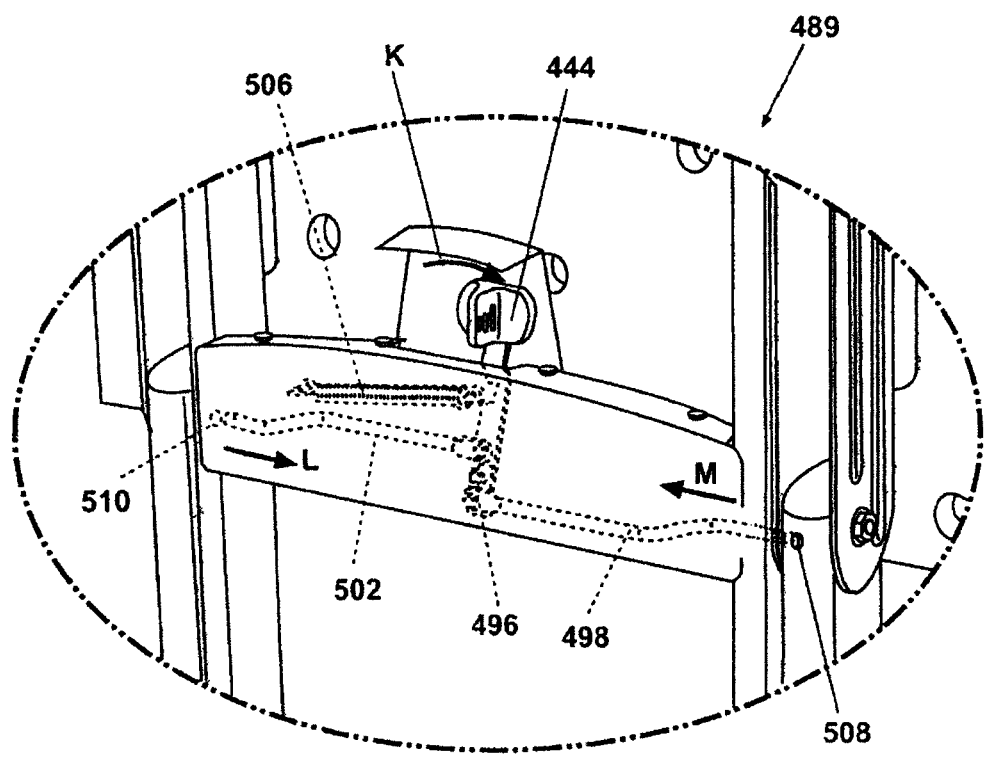
FIG. 29 is a rear perspective view similar to FIG. 28 showing the release mechanism in a release position.

Referring to FIG. 29, an un-latched position of latch mechanism 489 is shown. To reach the un-latched position, release lever 444 is rotated in a release directional arc "K" which has as its axis of rotation pin 496. First rod 498 is displaced in a release direction "M". Second rod 502 is displaced in a release direction "L". By disengaging each of first and second rods 498, 502 from apertures 508, 510, respectively, first and second inner legs 430, 432 can be rotated relative to first and second outer legs 426, 428. As release lever 444 is rotated, an increased biasing forced is created by a biasing element 506. When release lever 444 is released, the biasing force of biasing element 506 tends to reposition release element 444 back to its latched position. Release lever 444 can therefore be held by biasing element 506 in the position shown in FIG. 29 during the final phase of collapsing collapsible frame 406 until first and second rods 498, 502 realign with apertures 508 and 510, respectively.

Figure 30:
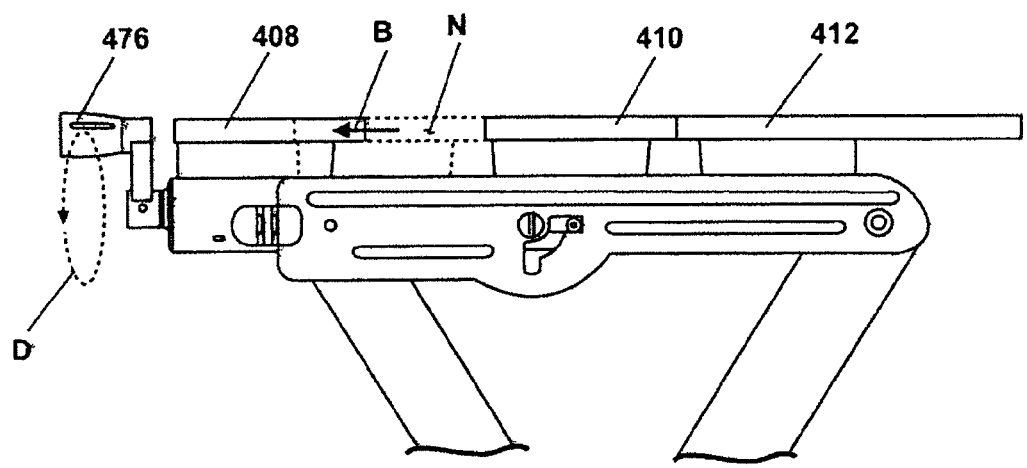
FIG. 30 is a partial side elevational view similar to FIG. 27.
Figure 31:
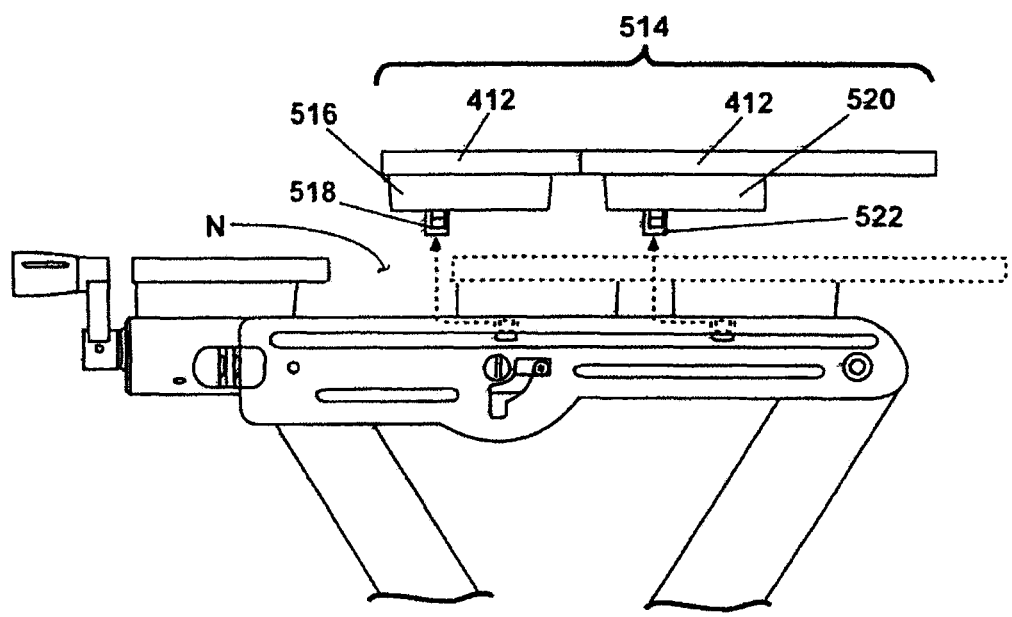
FIG. 31 is a partial side elevational view similar to FIG. 27, further showing the removal paths of workbench sections.
Figure 32:
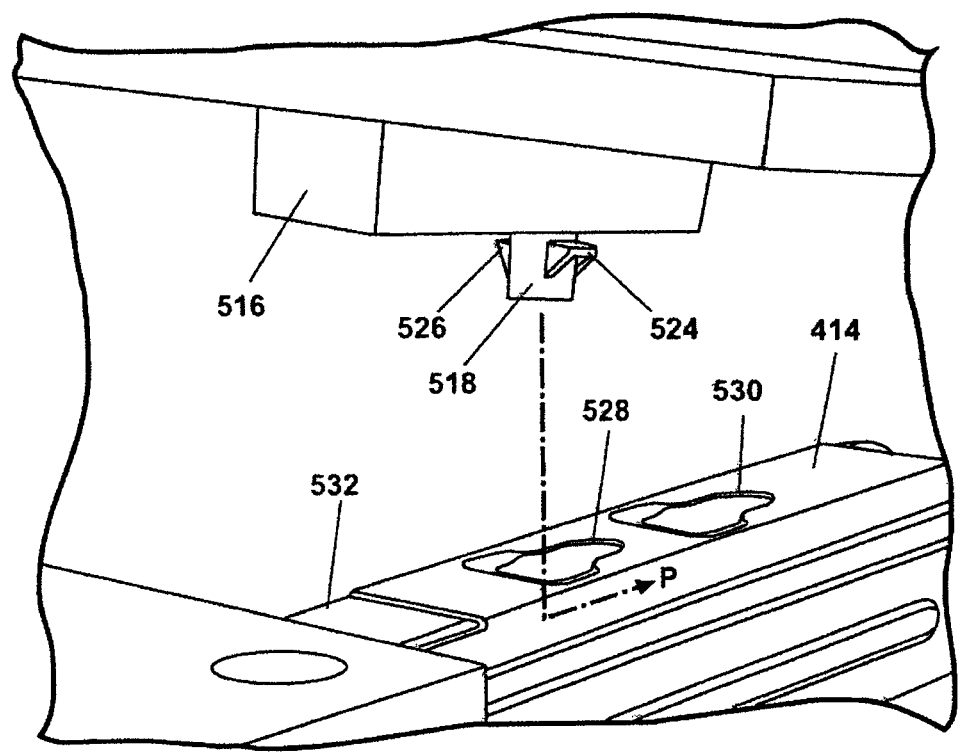
FIG. 32 is a partial perspective view taken from FIG. 31, showing the keyed member and slotted keyway of the workbench sections of the present disclosure.

Referring generally to FIGS. 30 through 32, a method to install or remove individual members of top structure 402 is identified. From the position of top structure 402 shown in FIG. 27, each of handles 476 and 478 are rotated in the counterclockwise direction "D" such that first top member 408 is displaced in the opening direction "B" creating a clearance gap "N" between first top member 408 and both second and third top members 410 and 412. Either or both of second and third top members 410 and 412 can then be displaced to the left as shown in FIG. 31 to permit release or relocation of either or both second and third top members 410 and 412. For example, a sub-assembly 514 including both second and third top members 410 and 412 can be translated for removal or relocation.

Second top member 410 is connectably joined to a spacer 516. Spacer 516 further has a keyed pin 518 extending therefrom. Similarly, third top member 412 is connectably joined to a spacer 520 which similarly has a keyed pin 522 extending therefrom. Sub-assembly 514 is translated into the clearance gap "N" to release the sub-assembly. As further detailed in FIG. 32, each keyed pin 518, 522 (only keyed pin 518 is visible in this view) further includes a first and second wing 524, 526. An exemplary pair of key slots 528, 530 are created in both first support structure 414 and support member 532. To releasably engage one of the top members to either of first or second support structures 414, 416, the keyed pin is inserted into key slot 528 (or key slot 530) until both first and second wings 524 and 526 are below an elevation of support member 532. The top member is then pushed in the key engagement direction "P" engaging first and second wings 524, 526 with the support structure, preventing direct removal of the top member.

Figure 33:
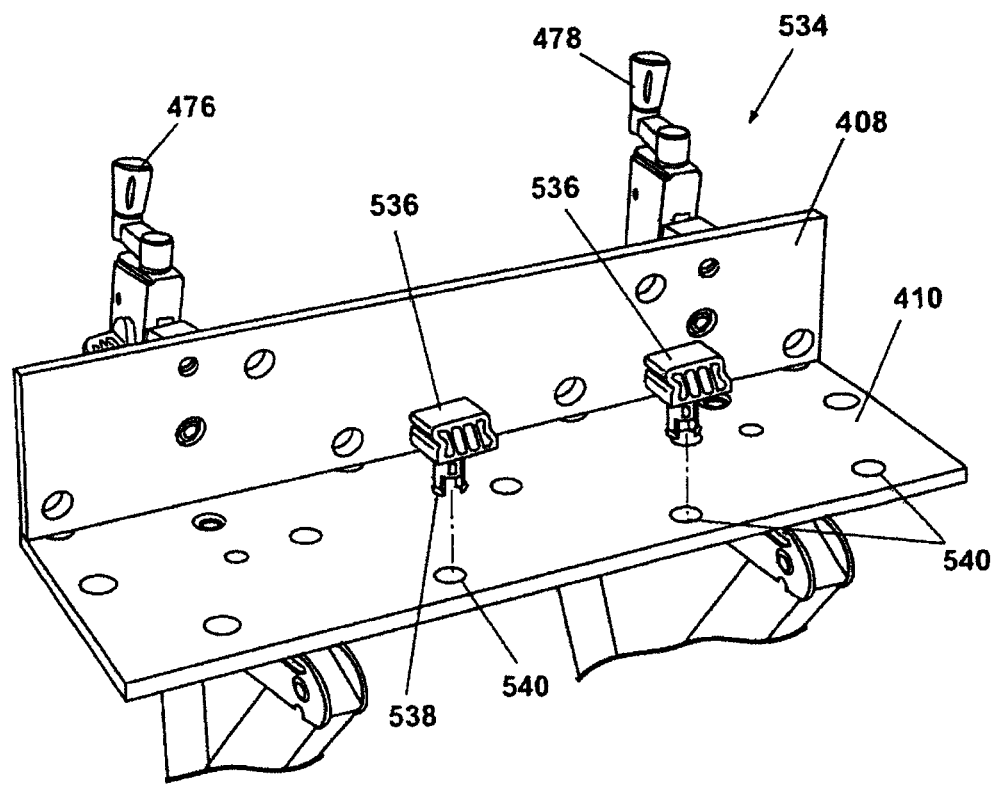
FIG. 33 is a front perspective view showing a 90 degree workbench configuration.
Figure 34:
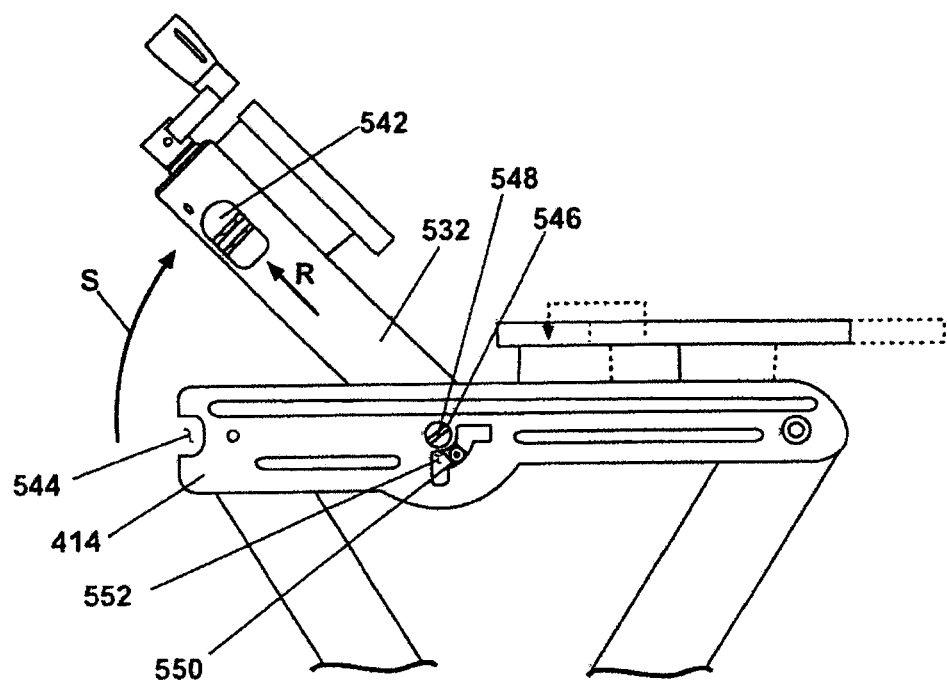
FIG. 34 is a partial side elevational view similar to FIG. 27, further showing an intermediate rotated position to achieve the 90 degree workbench configuration.

As seen in FIG. 33, an upright top member configuration 534 is shown. In the exemplary upright top member configuration 534 shown, first top member 408 is positioned substantially perpendicular to second top member 410. A pair of dogs 536 are also shown. Each of the dogs 536 includes at least one deflectable end 538 which releasably engages within an aperture 540 of one of the top members. Dogs 536 provide a releasable stop for work items placed on top structure 402. Dogs 536 can be releasably positioned in any of a plurality of apertures 540 formed in each of the top members of top structure 402.

To transition from the top structure 402 configuration shown in FIG. 27 to the upright top member configuration 534 shown in FIG. 33, first top member 408 is first translated to create clearance gap "N". To release support members 532 from first and second support structures 414 and 416, each of a pair of release toggles 542 connected to opposing ones of the support members 532 is translated in a displacement direction "R" until release toggles 542 physically displace from within an engagement slot 544 formed in a distal end of each of first and second support structures 414 and 416. Support members 532 are rotatably connected to each of first and second support structures 414 and 416 by a fastener 546. Each of the pair of support members 532 are then rotated about an arc "S". An axis of rotation 548 for arc "S" is formed through each fastener 546. A biased catch 550 is provided at a distal end of each of the support members 532. Biased catch 550 is slidably disposed within a slotted pathway 552. As each support member 532 rotates about arc "S", biased catch 550 rotates within slotted pathway 552.

Figure 35:
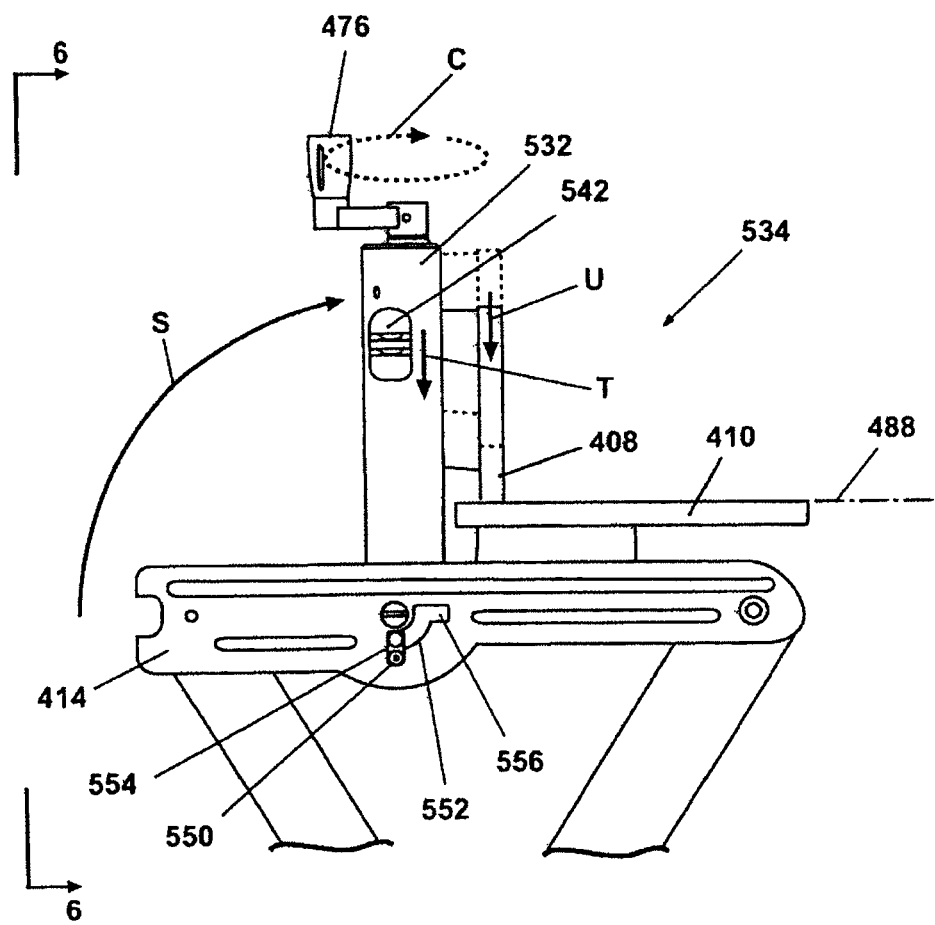
FIG. 35 is a partial side elevational view similar to FIG. 27, further showing the fully rotated position of the 90 degree workbench configuration.

As best seen in FIG. 35, both release toggle 542 and biased catch 550 are normally biased in the biased return direction "T". When support member 532 reaches the upright top member configuration 534, biased catch 550 slidably engages within a first slot 554 created within slotted pathway 552. Biased catch 550 positioned within first slot 554 subsequently prevents inadvertent rotation of support members 532. A second slot 556 is also created at the opposite end of slotted pathway 552 from first slot 554 for engagement by biased catch 550 when support members 532 are in the horizontal position substantially parallel with plane 488. After support members 532 reach the vertical position shown in FIG. 35, first top member 408 is directed by rotation of handles 476 and 478 in the downward direction as viewed in FIG. 35 until first top member 408 contacts second top member 410. Handles 476 and 478 are rotated in the clockwise rotation direction "C" during this translation.

Figure 36:
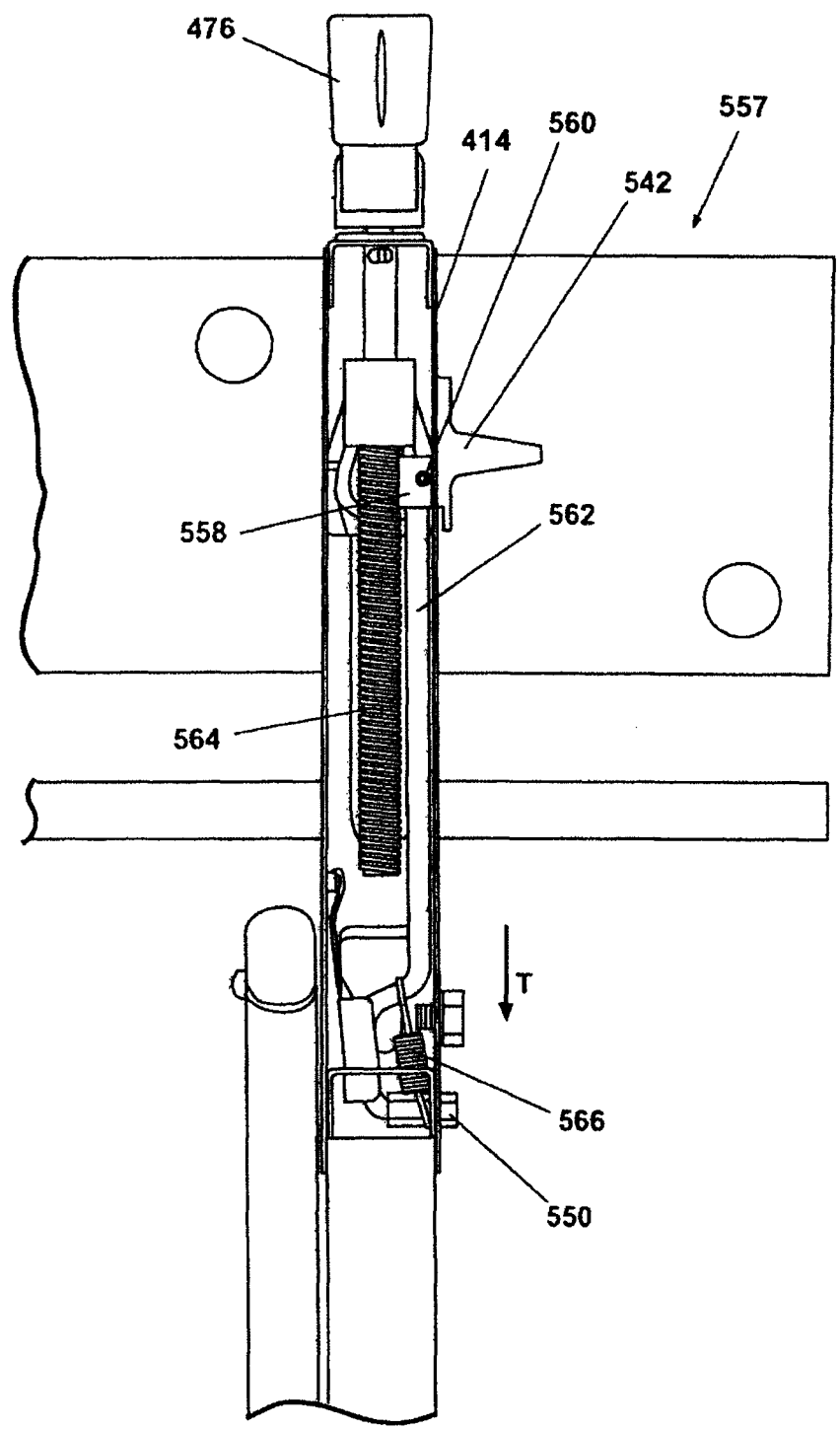
FIG. 36 is a partial end elevational view taken at elevation 6-6 of FIG. 35.
Figure 37:
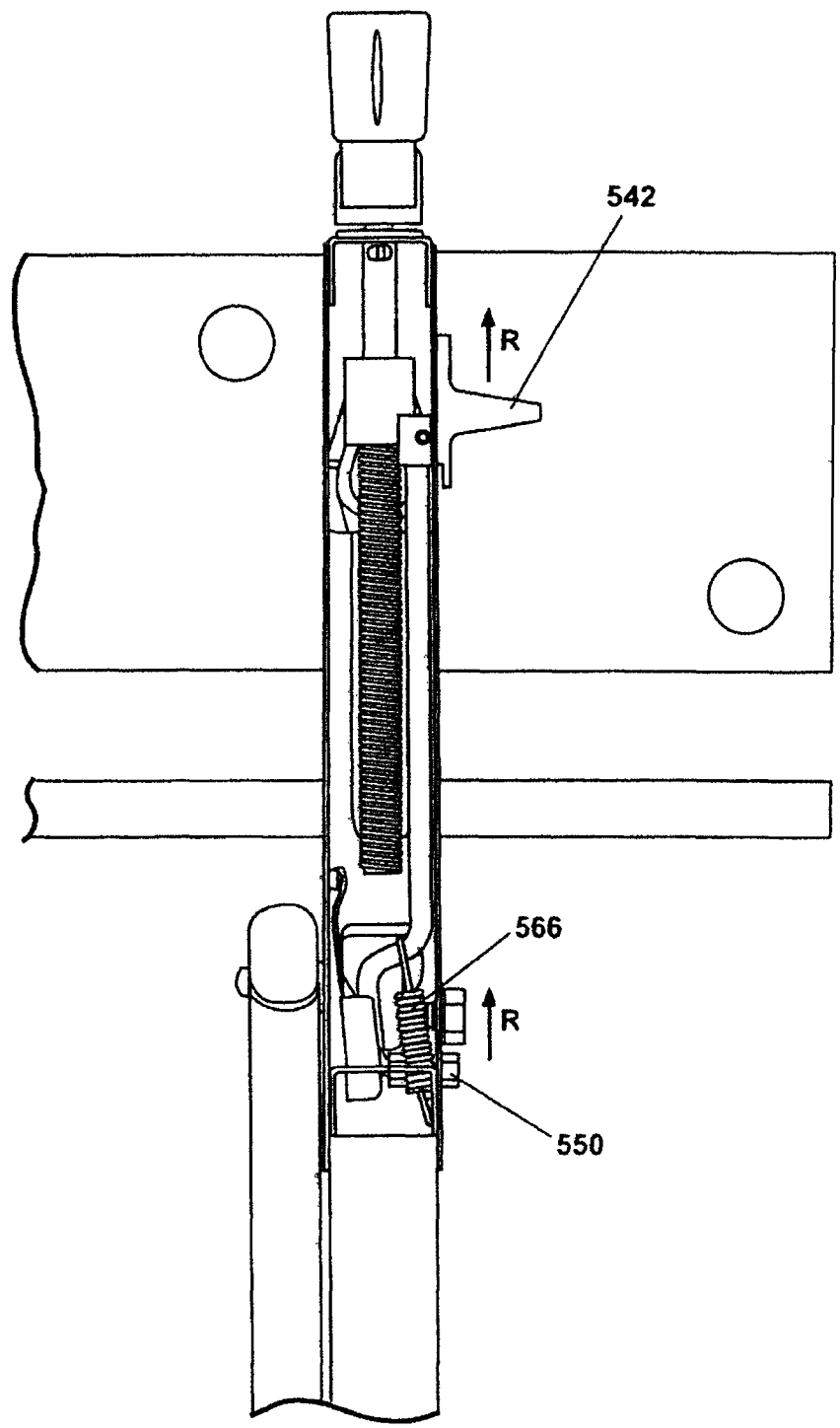
FIG. 37 is a partial end elevational view similar to FIG. 36 showing the displaced condition of the release mechanism.
Figure 38:
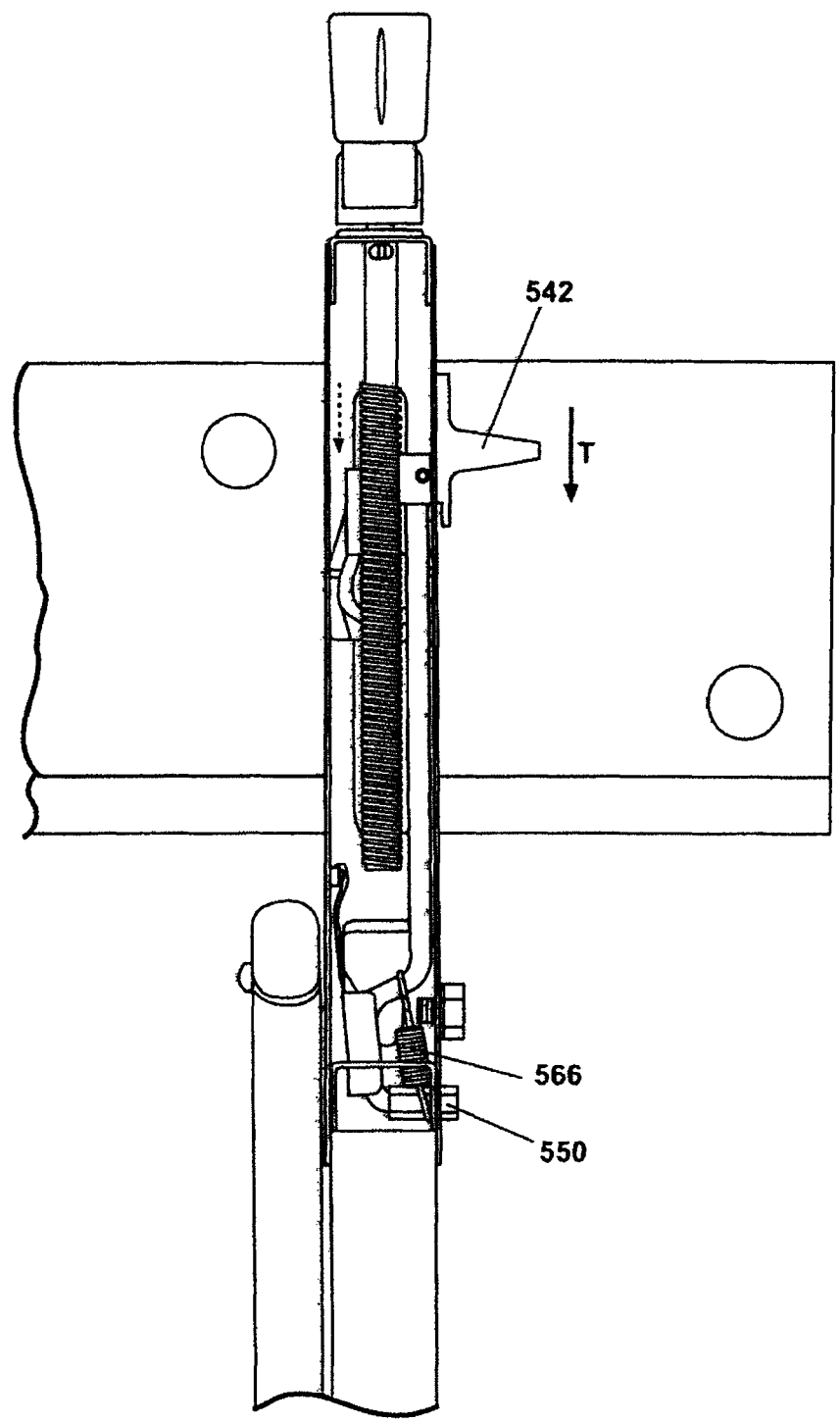
FIG. 38 is a partial end elevational view similar to FIG. 36 showing the biased locked condition of the release mechanism.

Referring generally to FIGS. 36 through 38, a displacement mechanism 557 includes release toggle 542 connectably joined to biased catch 550. Release toggle 542 includes a toggle body 558. A pin 560 disposed through toggle body 558 connectably joins a release rod 562 to toggle body 558. Release rod 562 is positioned generally parallel to a threaded rod 564 which is connectably disposed to handle 476 (a similar configuration is also used for handle 478) acting as a clamping device to engage opposing top surfaces. Release rod 562 is positioned to slidably clear threaded rod 564. Biased catch 550 is connected at a distal end of release rod 562. A biasing element 566 is connected between first support structure 414 and release rod 562 to provide a normal biasing force for release rod 562 in a biased return direction "T". Displacing release toggle 542 in the displacement direction "R', also displaces biased catch 550, which tensions biasing element 566. The biasing force generated by tensioning biasing element 566 thereafter returns release toggle 542 in the biased return direction "T" after the operator releases release toggle 542.

Figure 39:
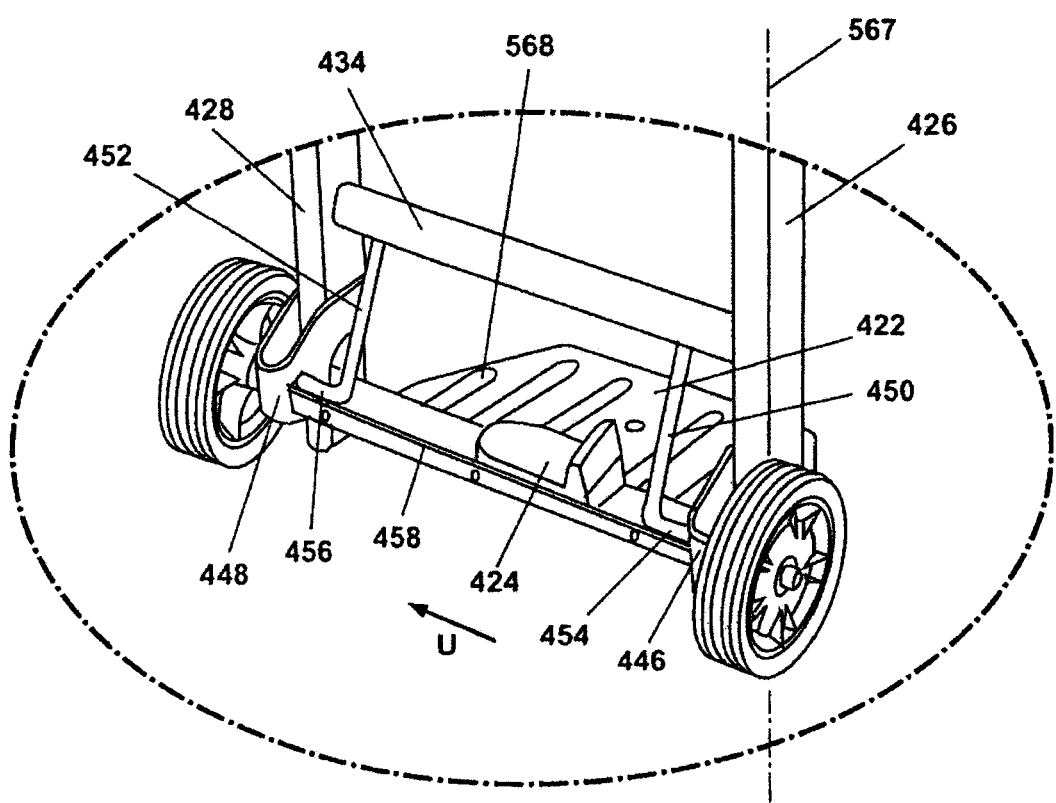
FIG. 39 is a partial rear perspective view taken at view 3 of FIG. 21 of the hand truck position.
Figure 40:
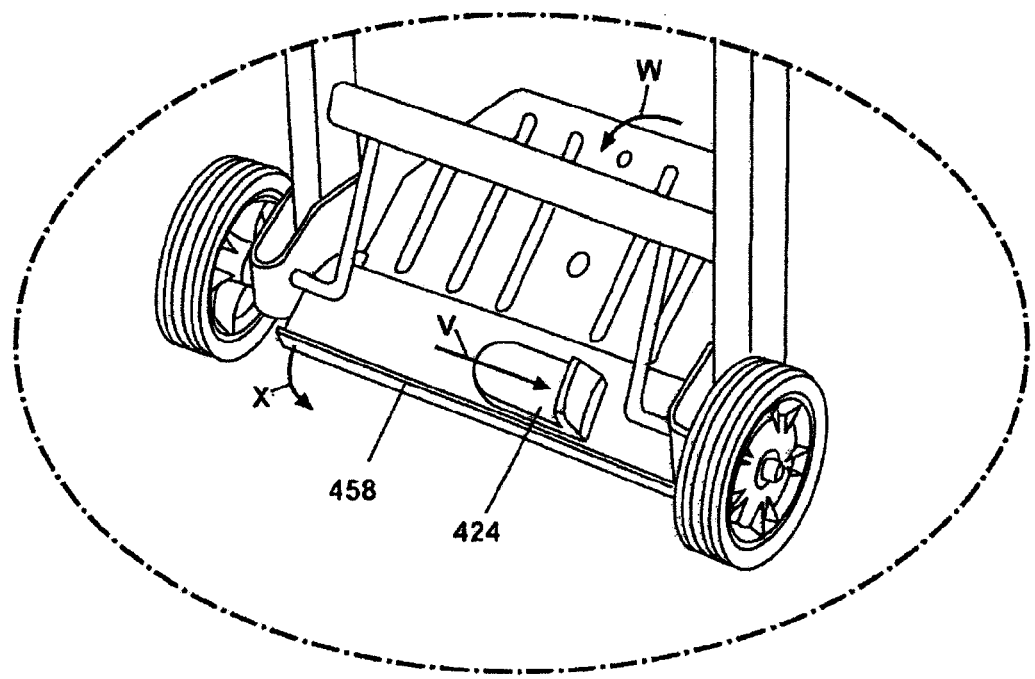
FIG. 40 is a partial rear perspective view modified from FIG. 39 to show an intermediate rotated position of the lift plate.
Figure 41:
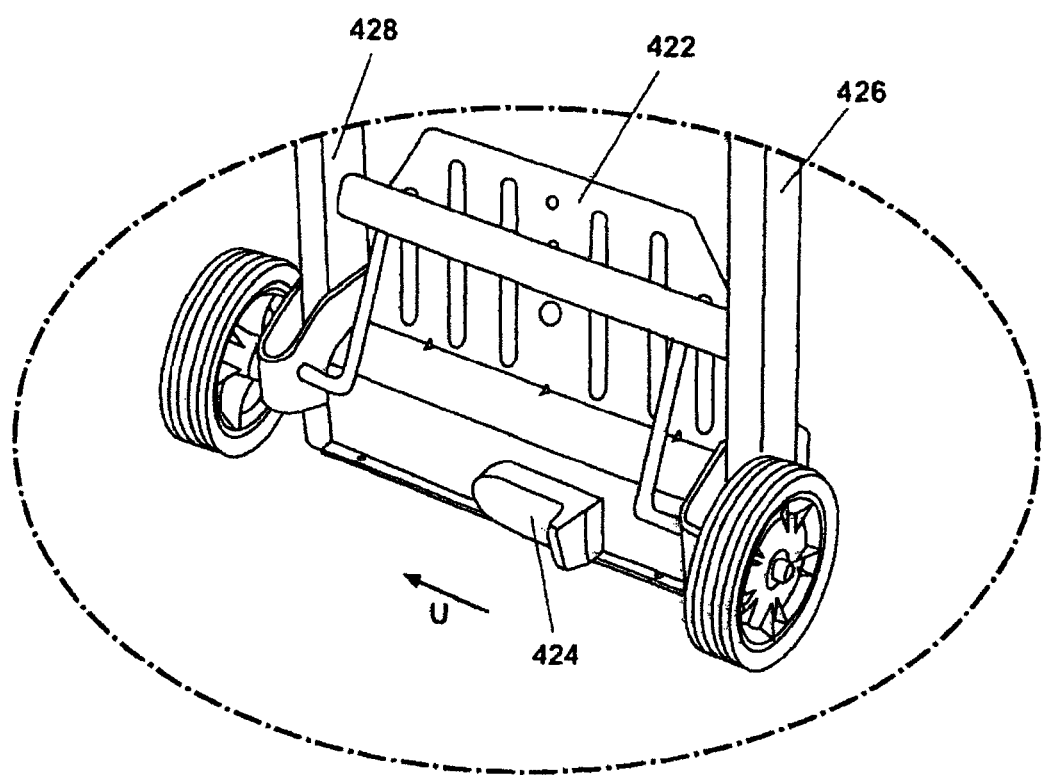
FIG. 41 is a partial rear perspective view further modified from FIG. 40 to show a fully rotated and latched/stowed position of the lift plate.

Referring generally to FIGS. 39 through 41, various positions for toe plate 422 are shown. In the lift truck position, toe plate 422 is rotated approximately 90 degrees from a longitudinal axis 567 of first and second outer legs 426 and 428. Toe plate 422 is latched in this position which allows portable workbench and lift truck assembly 400 to stand vertically upright as shown in FIG. 21. End wall 458 of lift plate 22 physically contacts first and second support ends 454 and 456 of first and second brace rods 450 and 452, respectively. A biasing force applied to release member 424 in the biasing force direction "U" retains the latched position for toe plate 422 until release member 424 is displaced, generally to the right as viewed in FIG. 40 in a displacement direction "V".

In one preferred embodiment of the present disclosure, toe plate 422 includes a plurality of reinforcement ribs 568 which are raised from a surrounding plate surface of toe plate 422. To release the toe plate 422 from the lift truck configuration shown in FIG. 39, release member 424 is displaced by the operator in displacement direction "V" either by foot or by hand. The operator then directs a displacement force at end wall 458, for example by foot pressure, in the rotation direction "X". This induces toe plate 422 to rotate about an arc "W" until toe plate 422 reaches the generally vertical position shown in FIG. 41. A biasing force normally applied to release member 424 in the biasing force direction "U" causes toe plate 422 to latch when the vertical position is reached as will be described in further detail below. In the latched upright position, toe plate 422 is positioned substantially parallel to longitudinal axis 567 of both first and second outer legs 426 and 428.

Figure 42:
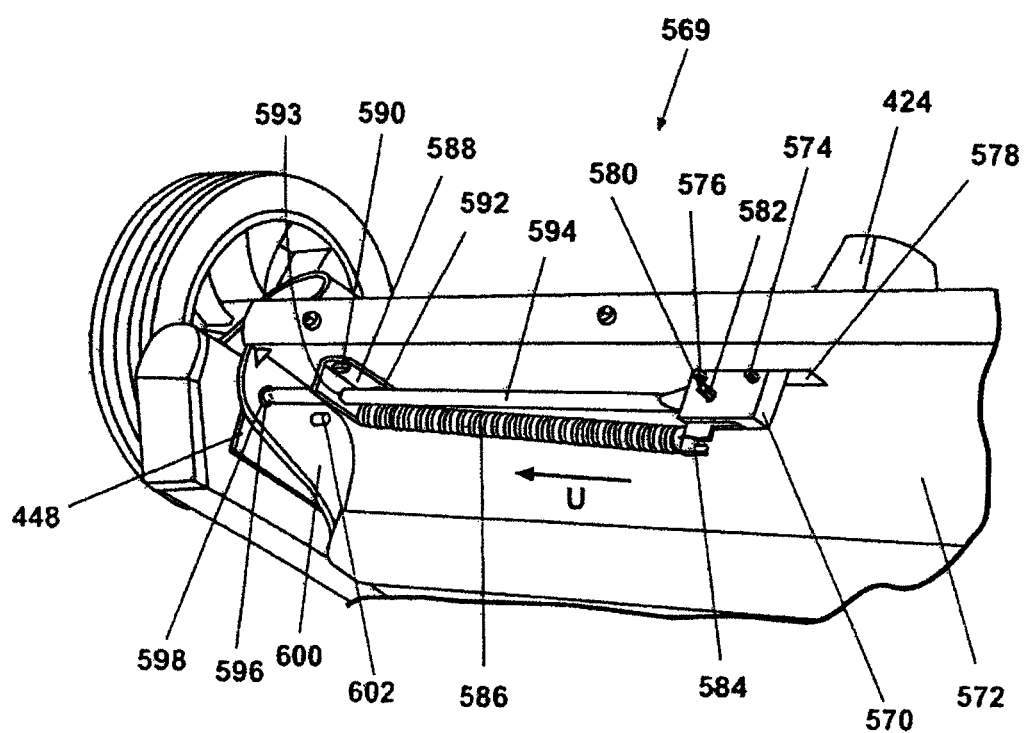
FIG. 42 is a perspective view of an underside of the lift plate of the present disclosure showing the lift plate latching mechanism in a latched position.
Figure 43:
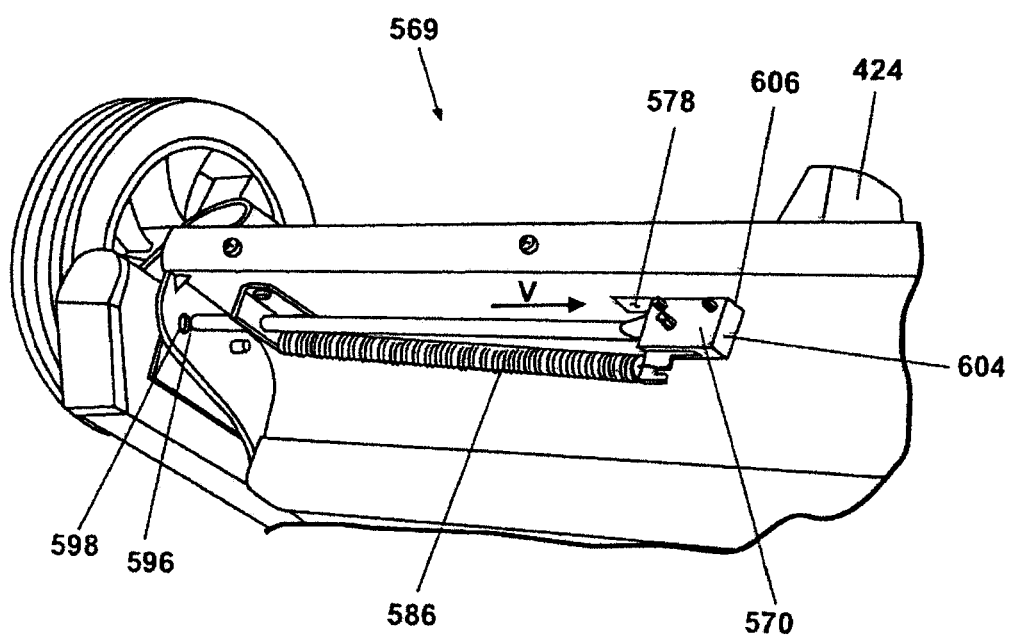
FIG. 43 is a perspective view similar to FIG. 42 showing the lift plate latching mechanism in a latched position.

Referring generally to FIGS. 42 and 43, a lift plate latch mechanism 569 is detailed. Lift plate latch mechanism 569 includes a member body 570 connected to release member 424. Member body 570 is substantially positioned below an under surface 572 of toe plate 422 as viewed in FIG. 42. Two pins 574, 576 extend through and outwardly from member body 570 to retain the position of member body 570 below under surface 572. Member body 570 is generally configured in a rectangular shape and is slidably disposed within a rectangular aperture 578 created in toe plate 422. In the latched position shown in FIG. 42, member body 570 contacts a first abutment end 580 of rectangular aperture 578. Member body 570 further includes a pin 582 disposed through member body 570. Pin 582 mechanically connects a hooked catch 584 to member body 570. A biasing member 586 is connected to hooked catch 584 at a first end and is connected to a bracket 588 at a second end. Bracket 588 is joined to under surface 572 via a pair of fasteners 590 and 592, respectively. A clearance aperture 593 is provided in the flange leg of bracket 588 to slidably support a rod 594 there through. A first end of rod 594 is also connected together with hooked catch 584 to member body 570 using pin 582. A distal end 596 of rod 594 is slidably disposed through a clearance aperture 598 formed in an end support wall 600 of toe plate 422. The biasing force created by biasing member 586 normally positions rod 594 within one of a pair of apertures (not shown) provided in second U-shaped bracket 448. The pair of apertures of second U-shaped bracket 448 are positioned such that capture of rod 594 latches toe plate 422 in either the lift truck position or the upper latched position shown in FIG. 41. Toe plate 422 is rotatably connected to each first and second U-shaped bracket 446 and 448 by a pin 602 (only a first one is shown).

To release toe plate 422 from a latched position using lift plate latch mechanism 569, release member 424 is displaced in the displacement direction "V" (to the right as viewed in FIG. 43) until an end face 604 of member body 570 contacts a second abutment end 606 of rectangular aperture 578. At this location of member body 570, distal end 596 of rod 594 is withdrawn from engagement with one of the apertures in second U-shaped bracket 448. At this time, distal end 596 is positioned approximately parallel to end support wall 600 providing clearance to second U-shaped bracket 448 for rotation of toe plate 422 about pin 602. Once distal end 596 disengages from the aperture of second U-shaped bracket 448 and toe plate 422 is in an intermediate rotation position, release member 424 can be released and the biasing force of biasing member 586 will direct distal end 596 and rod 594 to reengage the subsequent aperture in second U-shaped bracket 448.

Figure 44:
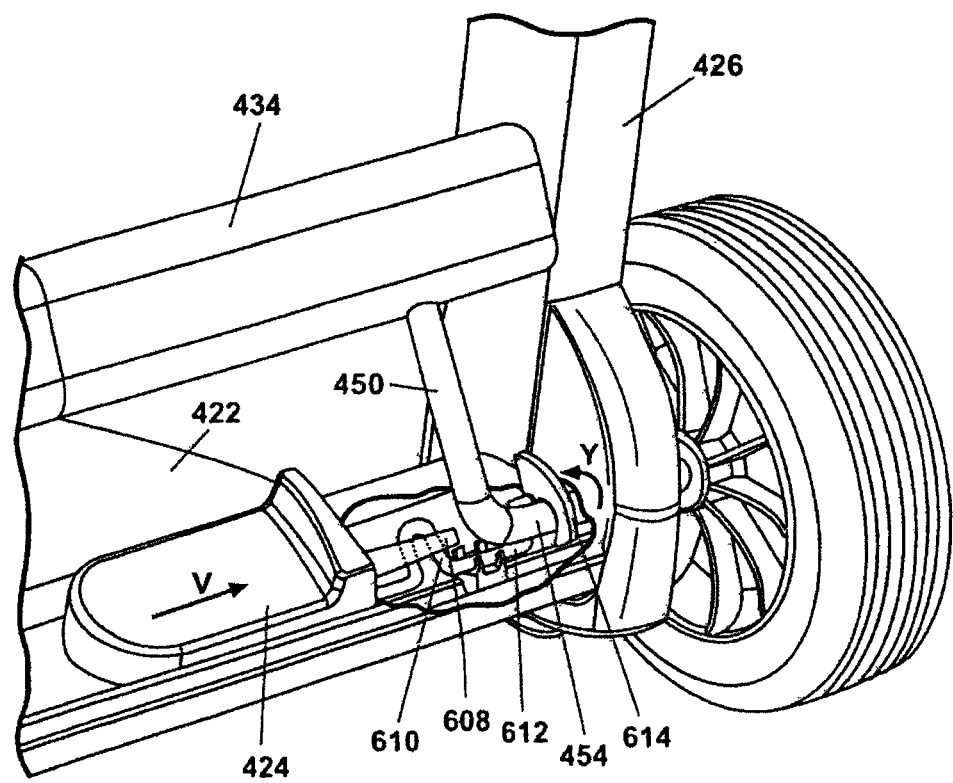
FIG. 44 is a perspective view showing another aspect of a latching member for the toe plate of the present disclosure.

Referring finally to FIG. 44, in another aspect of the present disclosure, toe plate 422 is provided with a latch member acting as a hook to positively engage first support end 454 of first brace rod 450. In this aspect, a tapered slide 608 connected to release member 424 is translated by release member 424 in the displacement direction "V". An increasing thickness of tapered slide 608 displaces a U-shaped portion 610 of a rod 612 in a downward direction as viewed in FIG. 44. Rod 612 includes a hook 614 at a distal end which rotates in response to rotation of U-shaped portion 610 generally counterclockwise as viewed in FIG. 44 in the arc direction "Y". Rotation in arc direction "Y" causes hook 614 to disengage from first support end 454. When release member 424 is released, a biasing force from biasing member 586 directs release member 424 to return in the direction "U" (as shown in FIG. 42) and a biasing force such as from a torsional biasing member (not shown) induces a clockwise rotation of hook 614 as viewed in FIG. 44. If toe plate 422 is positioned in the lift truck position, hook 614 engages first support end 454. When hook 614 is disengaged from first support end 454, toe plate 422 can be rotated to the upright position shown in FIG. 20. Hook 614 therefore provides an additional latching point for latch toe plate 422 in the lift or hand truck position.

Those skilled in the art can now appreciate from the foregoing description that the broad teachings of the present disclosure can be implemented in a variety of forms. For example, the workbench disclosed herein is described having slidable link members cooperating on each leg of the collapsible frame. It is envisioned however that the workbench may alternatively incorporate a single linkage cooperating with one leg while reaching similar results. Biasing elements 506, 566 and 586 are shown as coiled springs which are generally provided in spring steel material. Different biasing devices and/or materials can also be used. Pins 574, 575 and 582 can also be replaced with metal clips or polymeric parts.

Accordingly, while the disclosure has been described in the specification and illustrated in the drawings with reference to several preferred embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. For example, the position of latch mechanism 569 and/or displacement mechanism 557 can be reversed from the positions shown. Additional fixed handles can also used to assist using the folding bench with hand truck of the present disclosure for example during use in the hand truck position. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claim.

What is claimed is:

1. A portable workbench comprising:
   a pair of first support structures;
   a pair of second support structures, each second support structure being pivotally coupled to an associated one of the first support structures;
   a first top member coupled to the first support structures for movement with the first support structures relative to the second support structures;
   a second top member coupled to the second support structures for movement therewith relative to the first support structures; and
   a clamping mechanism coupled to the second support structures, the clamping mechanism being configured to selectively translate the second top member relative to the second support structures.

2. The portable workbench of claim 1, further comprising a lock that is configured to selectively fix a position of the second support structures in at least two predetermined positions.

3. The portable workbench of claim 2, wherein a first one of the at least two predetermined positions orients the second top member such that the second top member is horizontally movable relative to the first top member and wherein a second one of the at least two predetermined positions orients the second top member such that the second top member is vertically movable relative to the first top member.

4. The portable workbench of claim 2, wherein the lock comprises a slotted pathway, a catch, and a release toggle.

5. The portable workbench of claim 4, wherein the slotted pathway is formed in one of the first support structures, and wherein the catch and the release toggle are mounted to one of the second support structures.

6. The portable workbench of claim 4, wherein the slotted pathway comprises a plurality of locking slots for receipt of the catch, and wherein receipt of the catch into one of the locking slots maintains the position of the second support structures in an associated one of the at least two predetermined positions.

7. The portable workbench of claim 4, wherein the release toggle engages an associated one of the first support structures when the second support structures are positioned in one of the at least two predetermined positions.

8. The portable workbench of claim 1, further comprising a collapsible frame coupled to the first support structures.

9. The portable workbench of claim 8, further comprising a pair of wheels coupled to the collapsible frame.

10. A portable workbench comprising:
    a pair of first support structures;

a pair of second support structures, each second support structure being pivotally coupled to an associated one of the first support structures;

a first top member coupled to the first support structures;

a second top member;

a clamping mechanism coupled to the second support structures, the clamping mechanism being configured to selectively translate the second top member relative to the second support structures;

a collapsible frame coupled to the first support structures;

a pair of wheels coupled to the collapsible frame; and a toe plate pivotably coupled to the collapsible frame and selectively positionable in first and second toe plate positions, wherein the portable workbench is configured as a hand truck when the collapsible frame is at least partially retracted and the toe plate is positioned in the second position.

11. The portable workbench of claim 8, wherein the collapsible frame comprises opposed sets of legs, each set of legs being coupled to a corresponding one of the first support structures and having first and second legs that are pivotally coupled to one another.

12. The portable workbench of claim 11, wherein the first and second legs are positionable in a closed position, in which the first and second legs are oriented substantially parallel with each other, and a support position in which the first and second legs are transverse one another.

13. A portable workbench comprising:

a pair of first support structures;

a pair of pivot pins, each pivot pin being fixed to a corresponding one of the first support structures;

a pair of second support structures, each second support structure being pivotally mounted on a corresponding one of the pivot pins;

a first top member mounted to the first support structures;

a second top member coupled to the second support structures for movement therewith relative to the first support structures;

a clamping mechanism coupled to the second support structures, the clamping mechanism being configured to selectively translate the second top member relative to the second support structures; and a collapsible frame coupled to the first support structures.

14. The portable workbench of claim 1, further comprising a lock that is configured to selectively fix a position of the second support structures in at least two predetermined positions.

15. The portable workbench of claim 14, wherein a first one of the at least two predetermined positions orients the second top member such that the second top member is horizontally movable relative to the first top member and wherein a second one of the at least two predetermined positions orients the second top member such that the second top member is vertically movable relative to the first top member.

16. The portable workbench of claim 14, wherein the lock comprises a slotted pathway, a catch, and a release toggle.

17. The portable workbench of claim 16, wherein the slotted pathway is formed in one of the first support structures, and wherein the catch and the release toggle are mounted to one of the second support structures.

18. The portable workbench of claim 16, wherein the slotted pathway comprises a plurality of locking slots for receipt of the catch, and wherein receipt of the catch into one of the locking slots maintains the position of the second support structures in an associated one of the at least two predetermined positions.

19. The portable workbench of claim 16, wherein the release toggle engages an associated one of the first support structures when the second support structures are positioned in one of the at least two predetermined positions.

20. The portable workbench of claim 13, further comprising a pair of wheels coupled to the collapsible frame.

* * * * *